United States Patent
Togawa et al.

(10) Patent No.: US 11,092,879 B2
(45) Date of Patent: Aug. 17, 2021

(54) LENS BARREL, CAMERA BODY, CAMERA SYSTEM

(71) Applicant: NIKON CORPORATION, Tokyo (JP)

(72) Inventors: Hisanori Togawa, Tokyo (JP); Takumi Nakano, Tokyo (JP); Hiroki Takita, Tokyo (JP); Marie Shimoyama, Tokyo (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 16/609,166

(22) PCT Filed: Apr. 26, 2017

(86) PCT No.: PCT/JP2017/016639
§ 371 (c)(1),
(2) Date: Oct. 28, 2019

(87) PCT Pub. No.: WO2018/198256
PCT Pub. Date: Nov. 1, 2018

(65) Prior Publication Data
US 2020/0096783 A1     Mar. 26, 2020

(51) Int. Cl.
*G03B 17/14* (2021.01)
*G03B 5/06* (2021.01)
*G02B 27/64* (2006.01)

(52) U.S. Cl.
CPC .............. *G03B 17/14* (2013.01); *G03B 5/06* (2013.01); *G02B 27/646* (2013.01)

(58) Field of Classification Search
CPC ........ G03B 17/14; G03B 17/565; G03B 5/06; G02B 27/646

USPC .......................................................... 396/531
See application file for complete search history.

(56) References Cited

U.S. PATENT DOCUMENTS

| 2007/0058065 | A1 | 3/2007 | Saiki | |
| 2010/0259822 | A1* | 10/2010 | Huang | G03B 5/00 359/557 |
| 2012/0057860 | A1* | 3/2012 | Hasuda | G03B 17/14 396/531 |

(Continued)

FOREIGN PATENT DOCUMENTS

| JP | S63-152276 A | 6/1988 |
| JP | S63-280229 A | 11/1988 |

(Continued)

OTHER PUBLICATIONS

Aug. 1, 2017 International Search Report issued in International Patent Application No. PCT/JP2017/016639.

(Continued)

*Primary Examiner* — Christopher E Mahoney
(74) *Attorney, Agent, or Firm* — Oliff PLC

(57) ABSTRACT

A camera system and a lens barrel capable of improving practicality and convenience by enabling smooth lens exchange in a lens-interchangeable camera having a vibration correction mechanism that integrally drives a lens barrel and an image capturing unit. A lens barrel to which a camera body can be detachably attached, the lens barrel including: a first barrel having a first engaging portion that engages with a first portion of the camera body; and a second barrel disposed inside the first barrel and having an optical system and a second engaging portion that engages with a second portion of the camera body.

14 Claims, 14 Drawing Sheets

(56) References Cited

U.S. PATENT DOCUMENTS

| | | | | |
|---|---|---|---|---|
| 2013/0022341 A1* | 1/2013 | Chien | ................... | G03B 5/02 |
| | | | | 396/73 |
| 2013/0176629 A1 | 7/2013 | Nakayama et al. | | |
| 2013/0223828 A1 | 8/2013 | Enomoto | | |
| 2020/0409032 A1* | 12/2020 | Nagaoka | ............. | H04N 5/2254 |
| 2021/0103204 A1* | 4/2021 | Togawa | ............... | G02B 27/646 |

FOREIGN PATENT DOCUMENTS

| | | | |
|---|---|---|---|
| JP | H05-333416 A | | 12/1993 |
| JP | 06-294994 | * | 10/1994 |
| JP | 2007-074602 A | | 3/2007 |
| JP | 2010-191007 A | | 9/2010 |
| JP | 2013-140285 A | | 7/2013 |
| JP | 2013-174773 A | | 9/2013 |
| JP | 2016-141239 A | | 8/2016 |
| WO | 2013/129221 A1 | | 9/2013 |

OTHER PUBLICATIONS

Jan. 6, 2021 Office Action issued in Chinese Patent Application No. 201780090040.1.
Feb. 2, 2021 Office Action issued in Japanese Patent Application No. 2019-514975.
Apr. 27, 2021 Office Action issued in Japanese Patent Application No. 2019-514975.

* cited by examiner

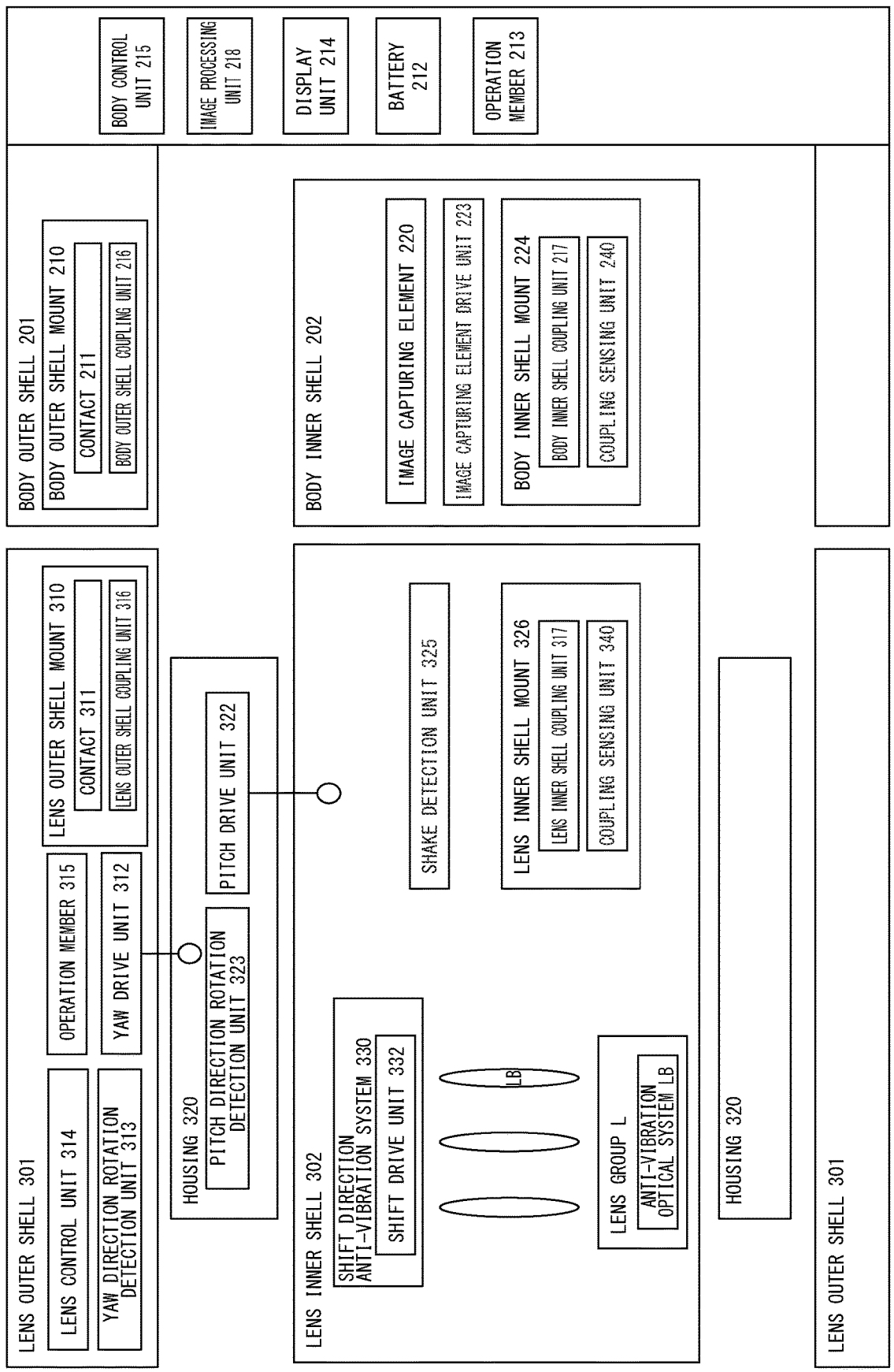

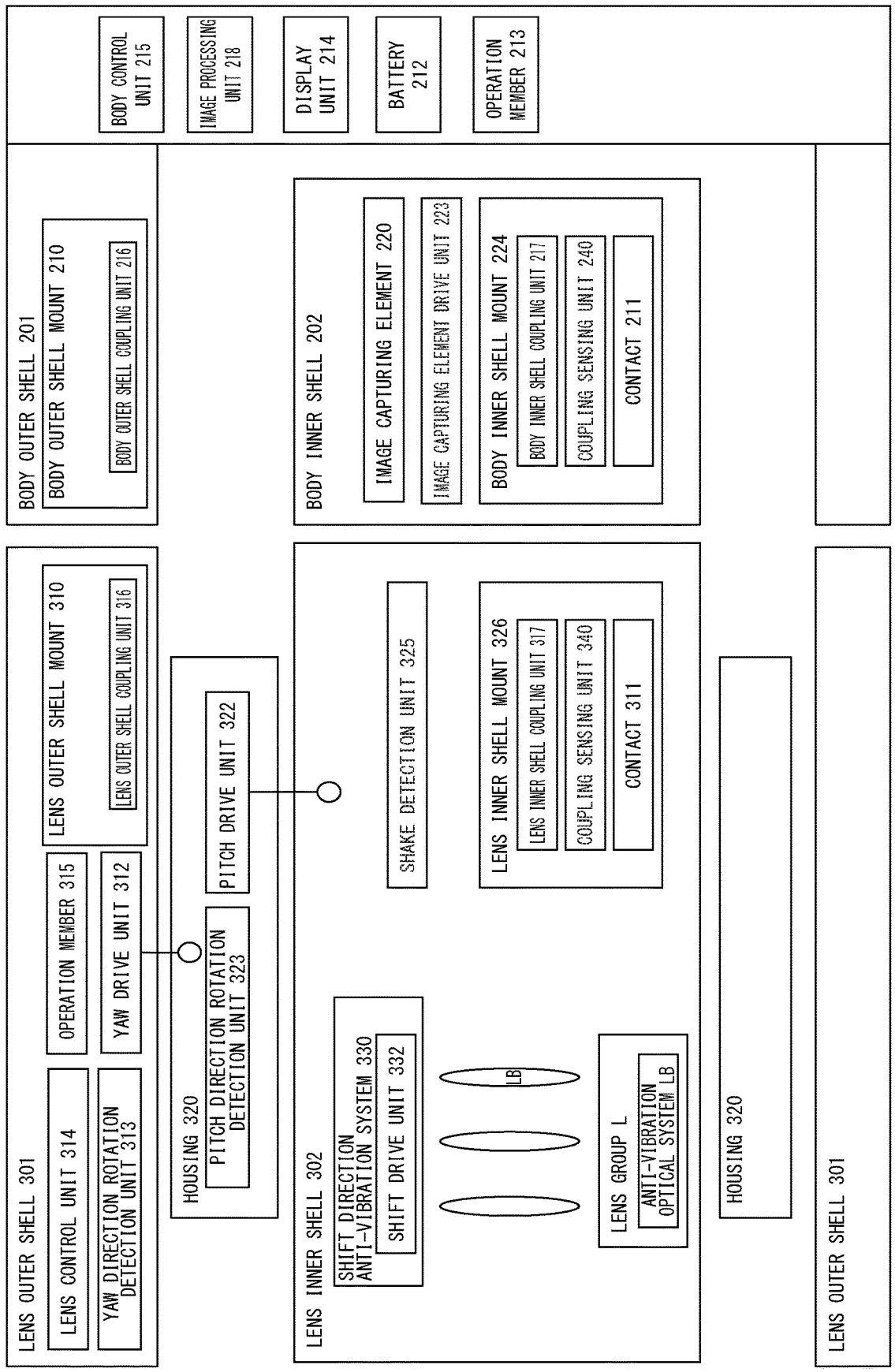

LENS BARREL, CAMERA BODY, CAMERA SYSTEM

TECHNICAL FIELD

The present invention relates to a lens barrel, a camera body and a camera system.

BACKGROUND ART

Conventionally, in an image capturing device that can shoot moving images, in order to correct a wide range shake correction angle, a shake correction mechanism is present in which a lens barrel integral with an image capturing unit is provided so as to be able to swing with respect to the outer frame of the image capturing device, and which includes two drive units having a support shaft orthogonal to an optical axis (see patent document 1).

On the other hand, in an interchangeable lens camera, when a lens is changed, it is necessary that a lens barrel can be attached and detached with respect to a camera body.

Patent Document 1: Japanese Unexamined Patent Application, Publication No. 2013-140285

DISCLOSURE OF THE INVENTION

A lens barrel of the present invention is a lens barrel with respect to which a camera body can be attached and detached, and includes: a first barrel which includes a first engagement unit that engages with a first portion of the camera body; and a second barrel that is arranged inside the first barrel and which includes a second engagement unit that engages with a second portion of the camera body and an optical system. A camera body of the present invention is a camera body with respect to which a lens barrel can be attached and detached, and includes: a first housing which includes a first engagement unit that engages with a first barrel of the lens barrel; and a second housing that is arranged inside the first housing and which includes a second engagement unit that engages with a second barrel of the lens barrel and an image capturing element. A camera system of the present invention is a camera system with respect to which a camera body and a lens barrel can be attached and detached, the camera body includes: a first housing; and a second housing which includes an image capturing element and the lens barrel includes: a first barrel which engages with the first housing; and a second barrel which includes an optical system and which engages with the second housing.

BRIEF DESCRIPTION OF THE DRAWINGS

FIG. 1B is a simplified diagram of the system configuration of the camera system 1 which includes the lens barrel 3 of the first embodiment and the camera body 2;

FIG. 12B is a simplified diagram of the system configuration of the camera system 1 which includes the lens barrel 3 of the second embodiment and the camera body 2.

PREFERRED MODE FOR CARRYING OUT THE INVENTION

A description will be given below with reference to drawings and the like. In the following description, for ease of understanding, as necessary, terms such as a pitch axis P, a yaw axis Y and a roll axis R are used. In embodiments, the pitch axis P is an axis which extends in a left/right direction as seen from a shooter in a position (hereinafter referred to as the normal position) of a camera body 2 in a case where the shooter shoots a horizontally long image with an optical axis set horizontal when a lens barrel 3 is fitted to the camera body 2. The yaw axis Y is an axis which extends in an up/down direction in the normal position. The roll axis R is an axis which extends in the direction of the optical axis in the normal position. Hence, the pitch axis P, the yaw axis Y and the roll axis R are orthogonal to each other. The "orthogonal" includes not only exactly 90 degrees but also a range which is slightly displaced from 90 degrees due to a manufacturing error or an assembly error. It is assumed that rotation about the pitch axis P is pitching, that rotation about the yaw axis Y is yawing and that rotation about the roll axis R is rolling. Furthermore, it is assumed that the direction of the pitching is a pitch direction, that the direction of the yawing is a yaw direction and that the direction of the rolling is a roll direction. A direction along the pitch axis P or a direction along the yaw axis Y is assumed to be a shift direction.

First Embodiment

Figure 1A:
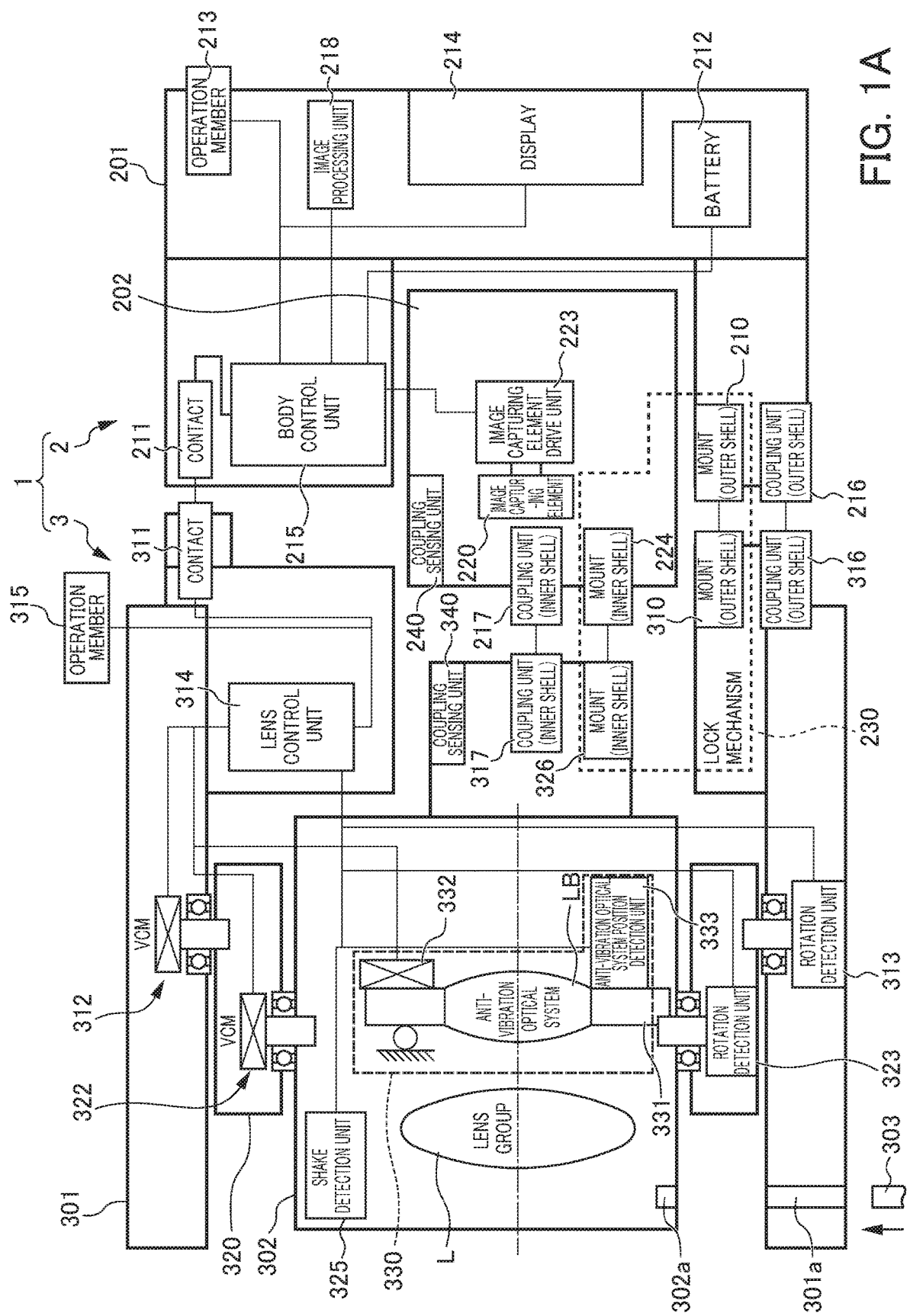
FIG. 1A is a system configuration diagram of a camera system 1 which includes the lens barrel 3 of a first embodiment and a camera body 2.

FIG. 1A is a system configuration diagram of a camera system 1 which includes the lens barrel 3 of a first embodiment and the camera body 2. FIG. 1B is a simplified diagram of the system configuration of the camera system 1 which includes the lens barrel 3 of the first embodiment and the camera body 2. Since FIGS. 1A and 1B show the same camera system 1, in these figures, for example, a configuration which is not included in one of the figures is complemented in the other figure, and thus they complement each other. The camera system 1 may be a system which can zoom or may be a system which cannot zoom.

(Lens Barrel 3)

The lens barrel 3 of the present embodiment can be attached and detached with respect to the camera body 2. The lens barrel 3 can be extended and contracted between a reduced barrel state (a non-shot state, a stored state, a retracted state) and an extended state (a shot state). As shown in the system configuration diagrams of FIGS. 1A and 1B, the lens barrel 3 includes: a lens inner shell 302 which holds, therewithin, a lens group L that is an image formation optical system; a housing 320 which is arranged on the outer circumference of the lens inner shell 302; a lens outer shell 301 (for example, a fixed barrel) which is arranged on the outer circumference of the housing 320; and the like. The lens inner shell 302 may be combined with the housing 320 so as to form a lens inner shell.

In the lens barrel 3 of the present embodiment, the lens inner shell 302 can be rotated about the pitch axis P with respect to the housing 320 in the pitch direction. The housing 320 can be rotated about the yaw axis Y with respect to the lens outer shell 301 in the yaw direction.

When the outer shape of the lens barrel 3 as a whole is cylindrical, it is considered that the lens inner shell, the lens outer shell and the housing are also cylindrical. However, for example, in order for other components to be arranged, a flat portion may be provided in an inner circumferential surface or an outer circumferential surface. The shapes of the lens inner shell, the lens outer shell and the housing may be deformed as necessary by formation of a flat portion, a notch, part whose thickness is changed or the like. Instead of the cylindrical shape, a shape such as a quadrangular prism may be adopted.

(Lens Inner Shell 302)

As shown in FIGS. 1A and 1B, the lens inner shell 302 of the lens barrel 3 includes the lens group L, a shift direction anti-vibration system 330, a shake detection unit 325 and a lens inner shell mount 326. The lens inner shell 302 includes part of a pitch drive unit 322 which drives the lens inner shell 302 with respect to the housing 320 in the pitch direction.

The lens group L is the image formation optical system which forms a subject image on an image capturing element 220 arranged in the camera body 2. The lens group L includes an anti-vibration optical system LB. The anti-vibration optical system LB is moved in the shift direction so as to be able to correct image shake caused by hand shake or the like.

The shift direction anti-vibration system 330 is a system which controls the anti-vibration optical system LB that is moved in the shift direction. The shift direction anti-vibration system 330 includes; a movable frame which holds the anti-vibration optical system LB; an anti-vibration optical system position detection unit which detects the position of the anti-vibration optical system LB; a shift drive unit 332 which drives the movable frame in the shift direction; and the like. Examples of the shift drive unit 332 include a voice coil motor (VCM) and the like. With the shift drive unit 332, the anti-vibration optical system LB is driven in such a direction as to cancel out the image shake of the subject image caused by hand shake or the like of the shooter, with the result that the image shake is corrected.

The shake detection unit 325 detects the shake of the lens inner shell 302 in the pitch direction, the yaw direction, the roll direction or the shift direction. The shake detection unit 325 preferably detects shake in at least one direction. The shake detection unit 325 may detect shake in all the directions. Examples of the shake detection unit 325 include a gyro-sensor and the like. The shake detection unit 325 may be formed with one sensor or a plurality of sensors.

The lens inner shell mount 326 has a shape which includes a lens inner shell coupling unit 317, and makes contact with a body inner shell mount 224 which will be described later. The lens inner shell mount 326 includes a coupling sensing unit 340. The details thereof will be described later.

(Housing 320)

The housing 320 includes the pitch drive unit 322 and a pitch direction rotation detection unit 323. The pitch drive unit 322 drives the lens inner shell 302 in the pitch direction. When the pitch drive unit 322 is driven, the lens inner shell 302 is rotated about the pitch axis P in the pitch direction.

The pitch direction rotation detection unit 323 detects the amount of rotation of the lens inner shell 302 in the pitch direction. In other words, the pitch direction rotation detection unit 323 detects the amount of drive of the pitch drive unit 322. The pitch direction rotation detection unit 323 detects the amount of rotation of the lens inner shell 302 (or the amount of drive of the pitch drive unit 322), and thereby can determine whether or not the lens inner shell 302 (or the pitch drive unit 322) is accurately driven. The housing 320 includes part of a yaw drive unit 312 which drives the housing 320 with respect to the lens outer shell 301 in the yaw direction. When the yaw drive unit 312 is driven, the housing 320 is driven with respect to the lens outer shell 301 in the yaw direction. The lens inner shell 302 is also driven in the yaw direction accordingly.

(Lens Outer Shell 301)

As shown in FIGS. 1A and 1B, the lens outer shell 301 includes the yaw drive unit 312, a yaw direction rotation detection unit 313, an operation member 315, a lens outer shell mount 310 and a lens control unit 314. The yaw drive unit 312 drives the housing 320 in the yaw direction. The yaw direction rotation detection unit 313 detects the rotation of the housing 320 in the yaw direction. In other words, the yaw direction rotation detection unit 313 detects the amount of drive of the yaw drive unit 312. The yaw direction rotation detection unit 313 detects the amount of rotation of the housing 320 (or the amount of drive of the yaw drive unit 312), and thereby can determine whether or not the housing 320 (or the pitch drive unit 322) is accurately driven. The operation member 315 is a member which is operated by a user. The lens outer shell mount 310 includes a contact 311 for communication or energization. The lens outer shell mount 310 has a shape which includes a lens outer shell coupling unit 316. The lens control unit 314 controls the shift drive unit 332, the pitch drive unit 322 and the yaw drive unit 312. When the user operates the operation member 315 which will be described later, the lens control unit 314 moves the lens group L in the direction of the optical axis so as to change a focal length. The lens outer shell 301 and the lens inner shell 302 are electrically connected with a wiring unit such as a flexible printed wiring board (hereinafter, the FPC).

(Camera Body 2)

The camera body 2 will then be described. As shown in the system configuration diagrams of FIGS. 1A and 1B, the camera body 2 includes a body inner shell 202 and a body outer shell 201 (for example, a body fixing unit).

The body inner shell 202 includes the image capturing element 220, an image capturing element drive unit 223 and the body inner shell mount 224. The body outer shell 201 includes a body control unit 215, an image processing unit 218, a body outer shell mount 210, a display unit 214, a battery 212 and an operation member 213.

The image capturing element 220 receives light entering from the image formation optical system (lens group L) and converts it into electrical signals. The image capturing element drive unit 223 drives the image capturing element 220 so as to perform shake correction. The body inner shell mount 224 has a shape which includes a body inner shell coupling unit 217, and makes contact with the lens inner shell mount 326. The body inner shell mount 224 also includes a coupling sensing unit 240. The details thereof will be described later.

The body control unit 215 performs computation and control on shake correction which will be described later. The body control unit 215 performs various types of control based on an input of the operation member 213 and the like. The image processing unit 218 performs image processing on image data output from the image capturing element 220.

The body outer shell mount 210 includes a contact 211 for communication or energization. The body outer shell mount 210 has a shape which includes a body outer shell coupling unit 216. The display unit 214 displays information on the image data acquired by the image capturing element 220 and various types of settings. The operation member 213 is operated by the user. The body outer shell 201 and the body inner shell 202 are electrically connected with wiring such as an FPC.

In the configuration described above, the camera system 1 of the present embodiment is a camera system which can change the lens barrel 3, and can perform a shake correction operation with the lens inner shell 302 integral with the body inner shell 202 (hereinafter referred to as the "integral drive shake correction". In the camera system 1, the body outer shell 201 of the camera body 2 and the lens outer shell 301 of the lens barrel 3 are coupled to each other so as to be integral with each other. The body inner shell 202 of the camera body 2 and the lens inner shell 302 of the lens barrel 3 are coupled to each other so as to be integral with each other. When in this state, the shake detection unit 325 detects shake in the pitch direction or the yaw direction, the lens control unit 314 drives, based on an output signal thereof, the yaw drive unit 312 and the pitch drive unit 322 in such a direction as to cancel out the shake detected by the shake detection unit 325. Consequently, the shake correction is performed. The image shake of the subject image caused by hand shake or the like of the shooter is corrected. Lens shift shake correction using the shift direction anti-vibration system 330 can be performed simultaneously or selectively. Furthermore, shake correction which is performed by driving, with an unillustrated drive unit, the image capturing element 220 in any one of the shift direction, the pitch direction, the yaw direction and the roll direction may be performed.

Figure 2:
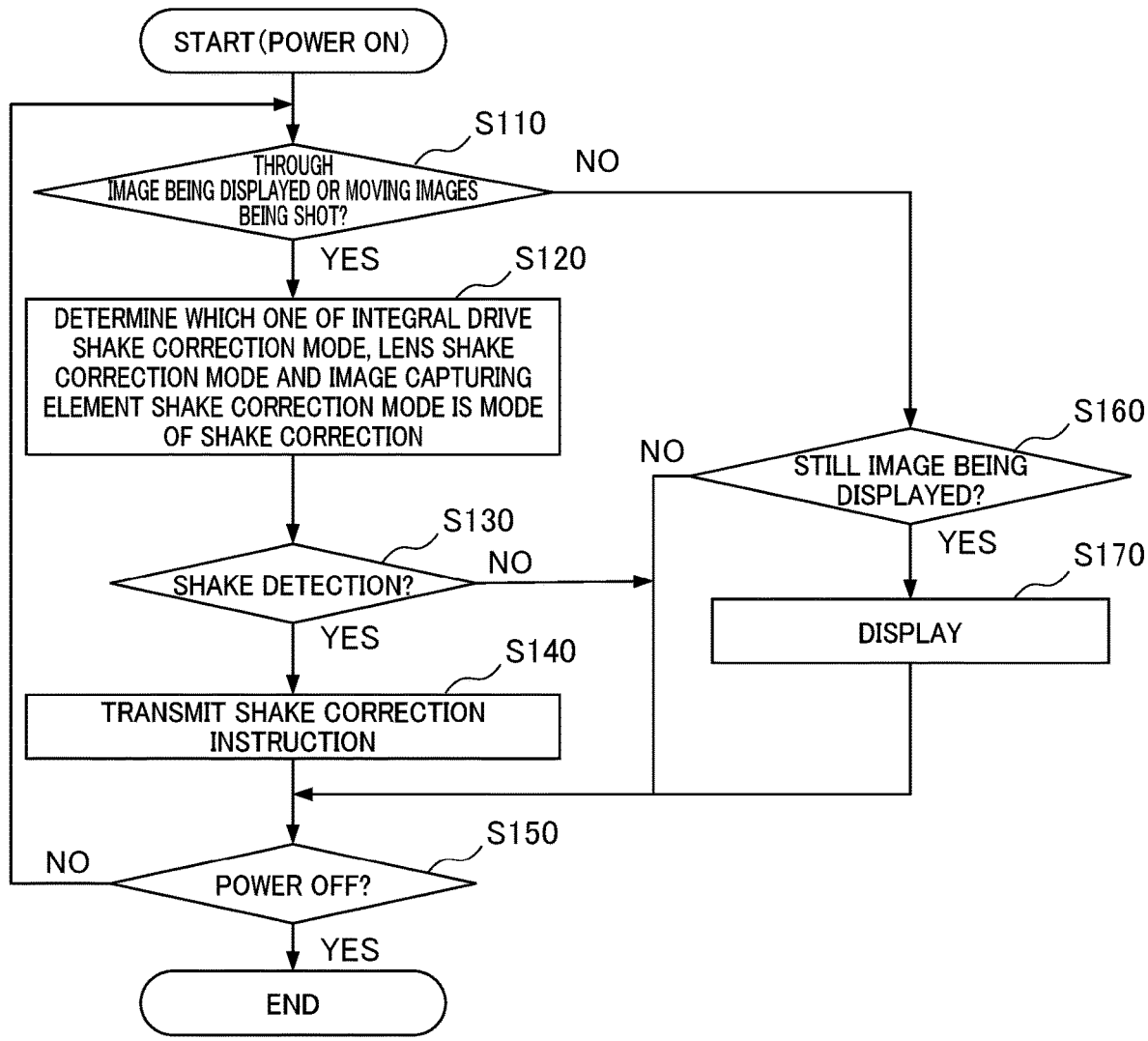
FIG. 2 is a flowchart showing a process which is performed by a body control unit 215.

The shake correction in the present embodiment will be described in detail. FIG. 2 is a flowchart showing a process which is performed by the body control unit 215. In the flowchart shown in FIG. 2, it is possible to perform three types of shake correction below.

(1) Integral drive shake correction: shake correction which is performed by integrally driving the lens inner shell 302 and the body inner shell 202.

(2) Lens shake correction:
shake correction which is performed in the shift direction anti-vibration system 330. The anti-vibration optical system LB is driven in the shift direction, and thus the image shake is corrected.

(3) Image capturing element shake correction: shake correction which is performed by moving the image capturing element 220. When the power of the camera body 2 is turned on, and thus an operation is started, in step (hereinafter referred to as S) 110, the body control unit 215 determines whether a through image is being displayed or moving images are being shot. When a through image is being displayed or moving images are being shot, the process proceeds to S120. When a through image is not being displayed and moving images are not being shot, the process proceeds to S160.

In S120, the body control unit 215 determines which one of an integral drive shake correction mode, a lens shake correction mode and an image capturing element shake correction mode is the mode of the shake correction. In this way, the details of the operation of the shake correction which will be performed thereafter are determined. The body control unit 215 determines, for example, based on the mode set by the user, the mode of the shake correction. Based on the magnitude of the shake detected with the shake detection unit 325, the body control unit 215 may automatically determine the mode of the shake correction. When in the system, each of the camera body 2 and the lens barrel 3 includes an inner shell, it may be determined that the mode of the shake correction is the integral drive shake correction mode whereas when in the system, at least one of them does not include an inner shell, it may be determined that the mode of the shake correction is the lens shake correction mode or the image capturing element shake correction mode.

In S130, the body control unit 215 determines whether or not the shake detection unit 325 detects shake. The shake detected in the shake detection unit 325 is acquired through the contacts 311 and 211 in the body control unit 215 of the camera body 2. The timing with which the body control unit 215 acquires the shake detected in the shake detection unit 325 is not limited to the time of S130. The lens barrel 3 may transmit the shake detected in the shake detection unit 325 to the camera body 2 with predetermined timing. The shake detection unit 325 can detect at least one of shake in the pitch direction, shake in the yaw direction, shake in the roll direction and shake in the shift direction. The shake detection unit 325 may detect shake in all the directions or may detect shake in a plurality of directions. Here, with respect to whether or not the shake detection unit 325 detects shake, for example, when the output value of the shake detection unit 325 is equal to or more than a fixed value, it is determined that the shake detection unit 325 detects shake. When the shake detection unit 325 detects at least one of shake in the pitch direction, shake in the yaw direction, shake in the roll direction and shake in the shift direction, the process proceeds to S140. When the shake detection unit 325 does not detect any of shake in the pitch direction, shake in the yaw direction, shake in the roll direction and shake in the shift direction, the process proceeds to S150.

In S140, the body control unit 215 transmits a shake correction instruction to the lens barrel 3. The shake correction instruction provided in S190 is an instruction which corresponds to the shake correction mode confirmed in S120. Specifically, when the mode of the shake correction in S120 is the integral drive shake correction mode, the body control unit 215 transmits, to the lens barrel 3, an instruction to drive the pitch drive unit 322 and the yaw drive unit 312. In which direction the yaw drive unit 312 and the pitch drive unit 322 are driven and how far they are driven are computed by the body control unit 215 based on the shake detected in S130, and the results are transmitted to the lens barrel 3. When in S120, the mode of the shake correction is the lens shake correction mode, the body control unit 215 transits, to the lens barrel 3, an instruction to control the shift direction anti-vibration system 330. The details of the control of the shift direction anti-vibration system 330 are computed by the body control unit 215 based on the amount of shake detected in S130, and the results are transmitted to the lens barrel 3. When in S120, the mode of the shake correction is the image capturing element shake correction mode, the body control unit 215 drives the image capturing element drive unit 223. The image capturing element drive unit 223 is driven, and thus the image capturing element 220 can be driven in any one of the pitch direction, the yaw direction, the roll direction and the shift direction. In this way, the image shake is corrected. When the mode of the shake correction is the image capturing element shake correction mode, it is not necessary to transmit the shake correction instruction to the lens barrel 3, and the body control unit preferably controls the image capturing element drive unit 223. The lens control unit 314 performs, according to instructions from the body control unit 215, control for driving individual actuators (the yaw drive unit 312, the pitch drive unit 322 and the shift drive unit 332 included in the shift direction anti-vibration system 330). In the computation of the shake correction performed by the body control unit 215, at least the detection value of the shake detection unit 325, information on a position in which the shake detection unit 325 is installed and the barycenter position information of the lens barrel 3 (or the barycenter position information of the lens inner shell 302) are needed. These pieces of information are used, thus parameters for the shake correction instruction necessary for each of the types of shake correction are computed and they are transmitted to the lens control unit 314. The computation of the shake correction may be performed by the lens control unit 314.

In S150, the body control unit 215 determines whether or not the power is turned off. When the power is not turned off, the process returns to S110 whereas when the power is turned off, the operation is completed.

In S160, the body control unit 215 determines whether or not a still image is being displayed. When a still image is being displayed, the process proceeds to S170. When a still image is not being displayed, the process proceeds to S15. In S170, the body control unit 215 continues to display a still image, and the process returns to S150.

Figure 3:
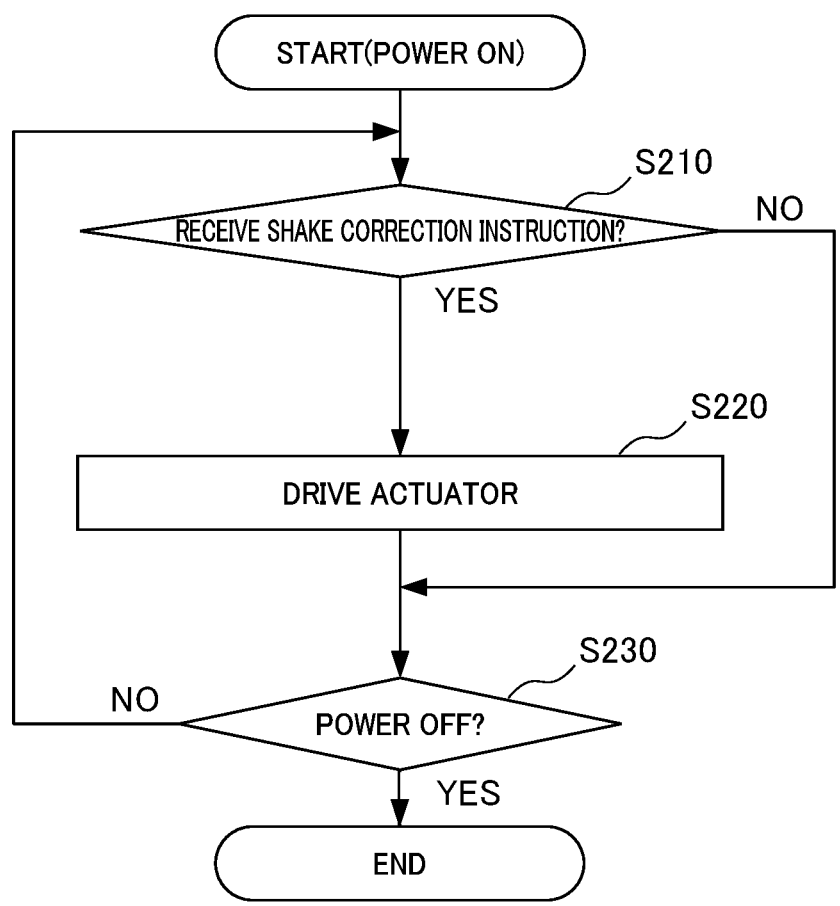
FIG. 3 is a flowchart showing a process which is performed by a lens control unit 314.

FIG. 3 is a flowchart showing a process which is performed by the lens control unit 314. In S210, the lens control unit 314 determines whether or not the shake correction instruction (shake correction instruction transmitted by the body control unit 215 in S140 of FIG. 2) is received from the camera body 2. When the shake correction instruction is received, the process proceeds to S220 whereas when the shake correction instruction is not received, the process proceeds to S230.

In S220, the lens control unit 314 drives, according to the shake correction instruction, the individual actuators so as to perform the shake correction operation. In S220, information as to which one of the actuators is driven, in which direction the actuator is driven and how far the actuator is driven is included in the shake correction instruction received from the camera body 2.

In S230, the lens control unit 314 determines whether or not the power is turned off. When the power is not turned off, the process returns to S210 whereas when the power is turned off, the operation is completed.

The details of the camera system 1 of the present embodiment will then be described in more detail for each configuration.

(1. Mount Configuration)

As described previously, the lens barrel 3 of the present embodiment includes: the lens outer shell coupling unit 316 which is provided in the lens outer shell 301; and the lens inner shell coupling unit 317 which is provided in the lens inner shell 302. The camera body 2 includes: the body outer shell coupling unit 216 which is provided in the body outer shell 201; and the body inner shell coupling unit 217 which is provided in the body inner shell 202. These coupling units form a bayonet. The lens outer shell coupling unit 316 and the body outer shell coupling unit 216 can be coupled to (may be engaged with) or separated from each other. Likewise, the lens inner shell coupling unit 317 and the body inner shell coupling unit 217 can be coupled to (may be engaged with) or separated from each other. The coupling or separation is performed with the bayonet. In the configuration as described above, the lens barrel 3 is freely attached and detached with respect to the camera body 2.

In the camera system 1, when the lens barrel 3 is attached to the camera body 2, the user rotates the lens outer shell 301 of the lens barrel 3 only by a predetermined angle (for example, 60°) with respect to the body outer shell 201, and thereby couples the lens outer shell 301 to the body outer shell 201 of the camera body 2. More specifically, the lens outer shell coupling unit 316 is engaged with the body outer shell coupling unit 216. As the lens outer shell 301 is rotated with respect to the body outer shell 201, the lens inner shell 302 is also rotated, and thus the lens inner shell coupling unit 317 engages with the body inner shell coupling unit 217, with the result that the lens inner shell 302 of the lens barrel 3 is coupled to the body inner shell 202 of the camera body 2. An operation of detaching the lens barrel 3 is reverse to the operation described above.

Here, the lens inner shell 302 is not fixed to the lens outer shell 301, and thus the lens inner shell 302 can be moved with respect to the lens outer shell 301 in a predetermined range. In other words, a relative positional relationship between the lens inner shell 302 and the lens outer shell 301 is changed. The body inner shell 202 is not fixed to the body outer shell 201, and thus the body inner shell 202 can be moved with respect to the body outer shell 201 in a predetermined range. In other words, a relative positional relationship between the body inner shell 202 and the body outer shell 201 is changed. Since as described above, the positional relationship between the inner shell and the outer shell is not fixed, when the lens barrel 3 is attached and detached with respect to the camera body 2, it is likely that the lens inner shell 302 and the body inner shell 202 are not reliably attached and detached. Hence, it is considered that the following configuration is adopted so as to attach and detach the lens inner shell 302 and the body inner shell 202.

(1-1. Inner Shell Lock Mechanism)

Figure 4:
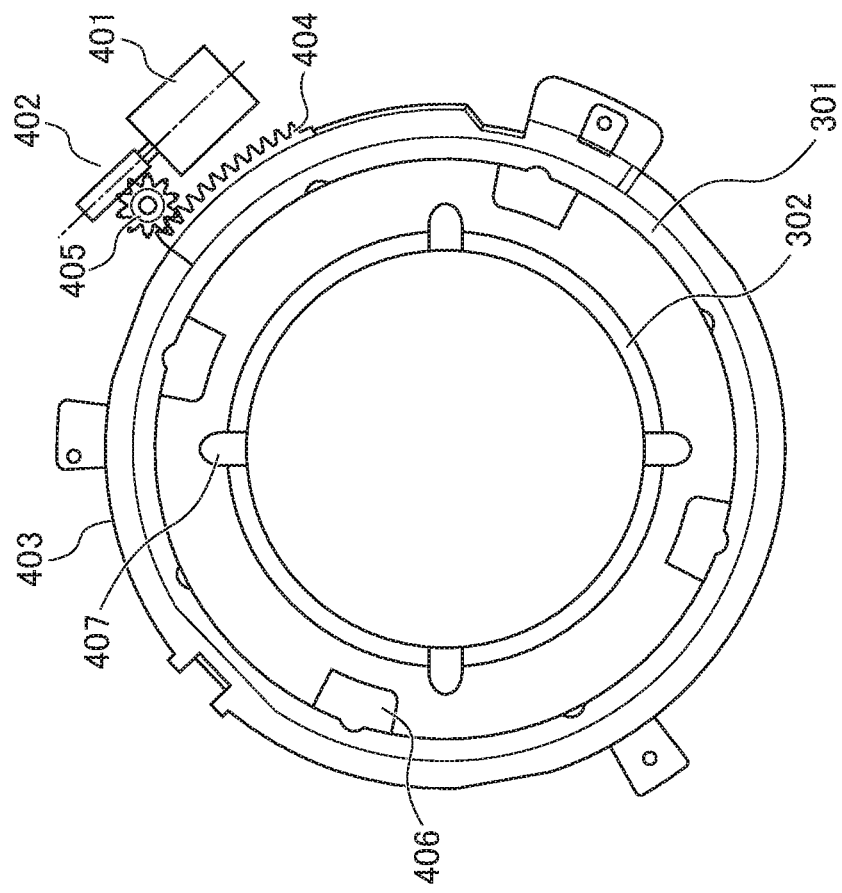
FIG. 4 is a diagram illustrating an example of a lens lock mechanism which locks a lens inner shell 302 to a lens outer shell 301.
Figure 4:
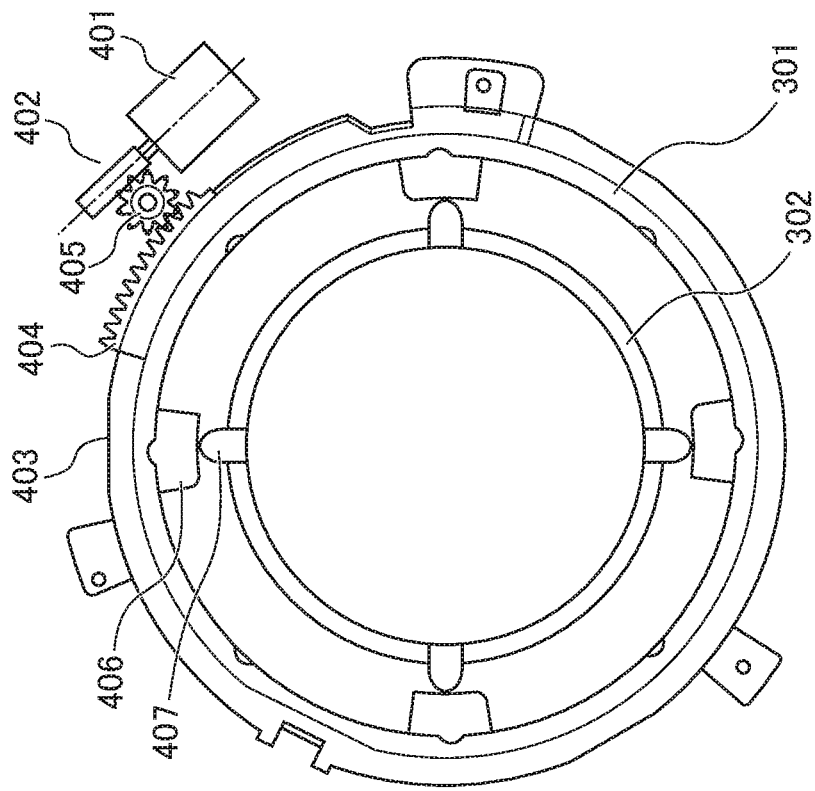

As a configuration in which the lens inner shell 302 and the body inner shell 202 can be attached and detached, a lock mechanism is mentioned which fixes (locks) the lens inner shell 302 to the lens outer shell 301 in a predetermined position. FIG. 4 is a diagram illustrating an example of a lens lock mechanism which locks the lens inner shell 302 to the lens outer shell 301. FIG. 4(a) shows a locked state, and FIG. 4(b) shows an unlocked state.

In the example shown in FIG. 4, a DC motor 401 and a worm gear 402 are attached to the lens outer shell 301 of the lens barrel 3. A lock ring 403 is turnably attached to the circumference of a cylindrical portion of the lens inner shell 302. In the circumference of the lock ring 403, a gear portion 404 is formed, and a gear member 405 is arranged between the worm gear 402 and the gear portion 404.

At the time of locking, the DC motor 401 is driven so as to rotate the worm gear 402, and thus the lock ring 403 is rotted through the gear member 405 and the gear portion 404. Then, a protrusion portion 406 provided on the inner circumferential side of the lock ring 403 makes contact with a protrusion portion 407 provided in the lens inner shell 302 so as to press it. In this way, the lens inner shell 302 is fixed to the lens outer shell 301.

At the time of unlocking, the DC motor 401 is driven in the opposite direction so as to rotate the worm gear 402, and thus the lock ring 403 is rotated in the opposite direction through the gear member 405 and the gear portion 404. Then, the protrusion portion 406 provided on the inner circumferential side of the lock ring 403 is brought into a non-contact state with the protrusion portion 407 of the lens inner shell 302, and thus the fixing of the lens inner shell 302 to the lens outer shell 301 is released. The lock ring 403 may be mechanically rotated as the camera body 2 and the lens barrel 3 are attached and detached.

Figure 5:
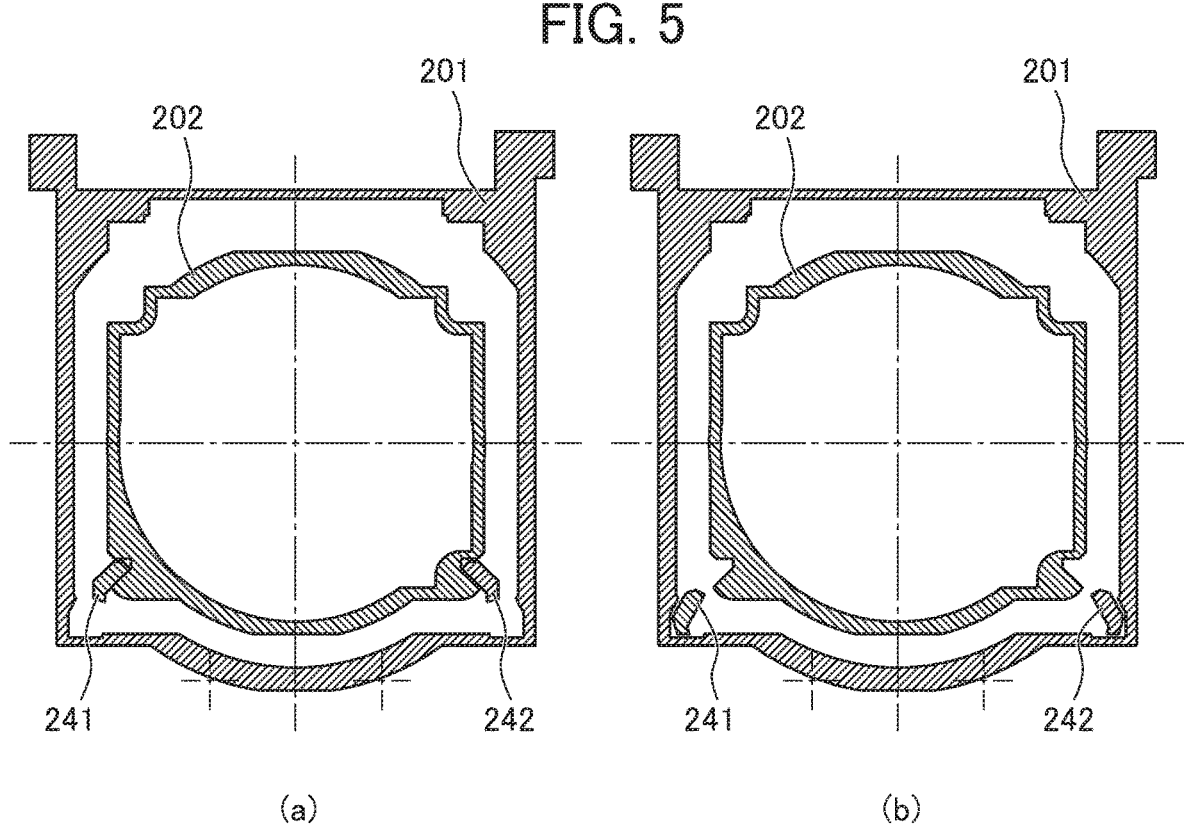
FIG. 5 is a diagram illustrating an example of a body lock mechanism which locks a body inner shell 202 to a body outer shell 201.

The same is true for the body side, and a lock mechanism is mentioned which fixes (locks) the body inner shell 202 to the body outer shell 201 in a predetermined position. FIG. 5 is a diagram illustrating an example of a body lock mechanism which locks the body inner shell 202 to the body outer shell 201. FIG. 5(a) shows a state where the body inner shell 202 and the body outer shell 201 are locked to each other, and FIG. 5(b) shows a state where the locking of the body inner shell 202 and the body outer shell 201 is released. In the body lock mechanism of FIG. 5, nail portions 241 and 242 which are driven with an unillustrated actuator are provided in the body outer shell 201. The nail portions 241 and 242 are moved, and thus it is possible to switch between the locked state and the unlocked state. The nail portions 241 and 242 may be mechanically moved as the camera body 2 and the lens barrel 3 are attached and detached.

In the following description, a mechanism for locking the lens inner shell 302 to the lens outer shell 301 in a predetermined position is referred to as the lens lock mechanism, and a mechanism for locking the body inner shell 202 to the body outer shell 201 in a predetermined position is referred to as the body lock mechanism. In the lens lock mechanism and the body lock mechanism as described above, a configuration is considered in which the locking is mechanically released. For example, the locking of the lens lock mechanism and the body lock mechanism is released as the lens barrel 3 is attached and detached. A configuration may be adopted in which the locking of the lens lock mechanism and the body lock mechanism is released by interlocking of an unillustrated switch. A configuration may also be adopted in which the locking of the lens lock mechanism and the body lock mechanism is electrically released with an unillustrated motor. For example, when it is sensed that the lens barrel 3 is fitted, an unillustrated motor is driven so as to release the locking of the lens lock mechanism and the body lock mechanism. A configuration may also be adopted in which when an unillustrated switch or the operation member 213 is operated, and thus an instruction to release the locking is detected, an unillustrated motor is driven so as to release the locking of the lens lock mechanism and the body lock mechanism. In this case, the unillustrated motor is provided in the lens barrel 3 and the camera body 2.

Although in the camera system 1 of the present embodiment, the lens inner shell 302 has such a degree of flexibility that the lens inner shell 302 can swing with respect to the lens outer shell 301, the movable range thereof is physically (mechanically) restricted. Likewise, although the body inner shell 202 has such a degree of flexibility that the body inner shell 202 can swing with respect to the body outer shell 201, the movable range thereof is physically (mechanically) restricted. Hence, even when the lens lock mechanism or the body lock mechanism is not operated or is not provided, though a predetermined degree of flexibility is provided for the rotation on the outer shell side, the inner shell is rotated so as to follow the rotation.

(1-2. Alignment Mechanism for Center Axis (Rotation Axis))

Since in the lens barrel 3, the lens inner shell 302 is supported with respect to the lens outer shell 301 so as to freely swing, a state where the lens inner shell 302 falls by its own weight and a state where the lens inner shell 302 is inclined with respect to the lens outer shell 301 are considered. When in such a state, the lens barrel 3 is fitted to the camera body 2, the rotation axis of the lens outer shell 301 and the rotation axis of the lens inner shell 302 are displaced from each other, and thus it may be impossible to smoothly attach the lens barrel 3 to the camera body 2. The same is true for the body inner shell 202 and the body outer shell 201.

Figure 6:
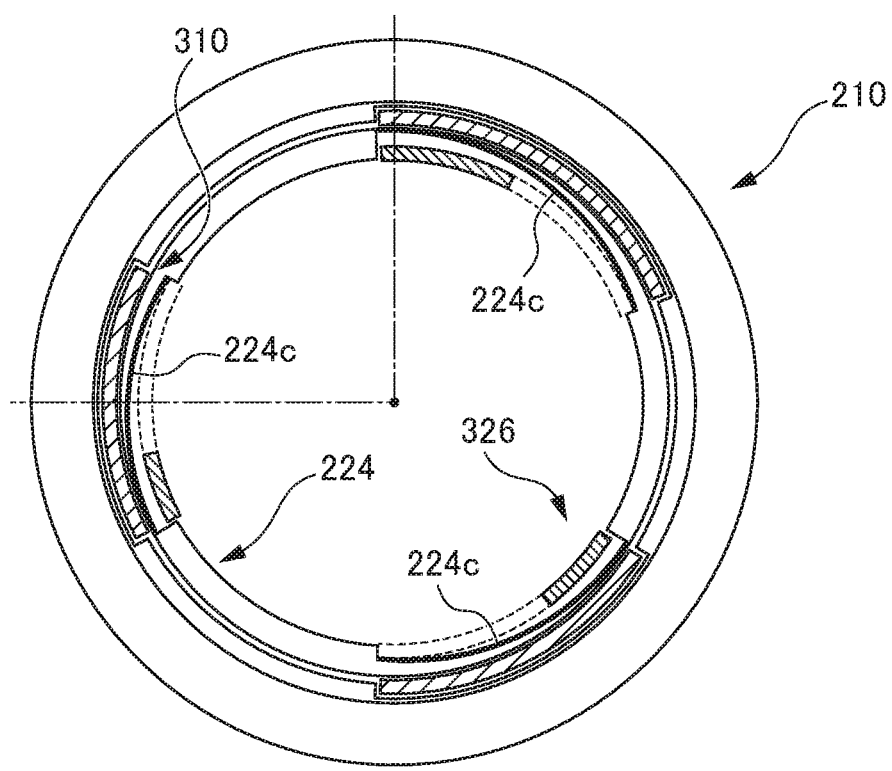
FIG. 6 is a front view showing an axis alignment mechanism.

Hence, as a second example of the configuration in which the lens inner shell 302 and the body inner shell 202 can be attached and detached, an axis alignment mechanism for aligning the rotation axis of the lens inner shell 302 with the rotation axis of the lens outer shell 301 when the lens outer shell 301 is rotated will be described. FIG. 6 is a front view when the axis alignment mechanism is seen from the subject side parallel to the optical axis. In the axis alignment mechanism, as shown in FIG. 6, as the lens inner shell 302 is rotated about the rotation axis thereof, the lens inner shell coupling unit 317 (for example, the nail portion) is rotated while being guided by a guide member 224c which is provided in the body inner shell mount 224 such that the inside diameter is gradually reduced, with the result that the lens inner shell 302 and the lens outer shell 301 engage with each other.

In the axis alignment mechanism, the lens inner shell coupling unit 317 engages with the body inner shell coupling unit 217. Hence, even when the rotation axis of the lens outer shell 301 and the rotation axis of the lens inner shell 302 are not aligned with each other, it is possible to smoothly attach the lens barrel 3 to the camera body 2. In this respect, the practicality and the convenience of the camera system 1 can be enhanced.

When the lens barrel 3 is detached from the camera body 2, the lens outer shell 301 of the lens barrel 3 is rotated in the opposite direction only by a predetermined angle (for example, 60°), and thus the state of the engagement with the body outer shell 201 in the camera body 2 is released. When the lens barrel 3 is rotated in the direction in which the lens barrel 3 is detached, the lens inner shell 302 is also rotated so as to follow the rotation of the lens outer shell 301. Consequently, the lens outer shell coupling unit 316 is detached from the body outer shell coupling unit 216, the lens inner shell coupling unit 317 is detached from the body inner shell coupling unit 217 and here, the operation of detaching the lens barrel 3 is completed.

Instead of the axis alignment mechanism as described above, a configuration may be adopted in which an actuator (unillustrated) is driven such that the rotation axes of the lens inner shell 302 and the lens outer shell 301 are aligned with each other, in which thus the lens inner shell 302 is moved as necessary and in which the rotation axis of the lens inner shell 302 is aligned with the rotation axis of the lens outer shell 301. The lock mechanism described above may be used so as to align the rotation axes of the inner shell and the outer shell with each other.

(1-3. Alignment Mechanism for Amount of Rotation of Mount)

In the camera system 1, as described above, the inner shell side has flexibility with respect to the outer shell side. Hence, when the lens barrel 3 is attached to the camera body 2, it is considered that the amount of rotation (rotation angle) of the lens inner shell 302 is insufficient, and that thus the body inner shell coupling unit 217 and the lens inner shell coupling unit 317 are not appropriately coupled to each other.

Figure 7:
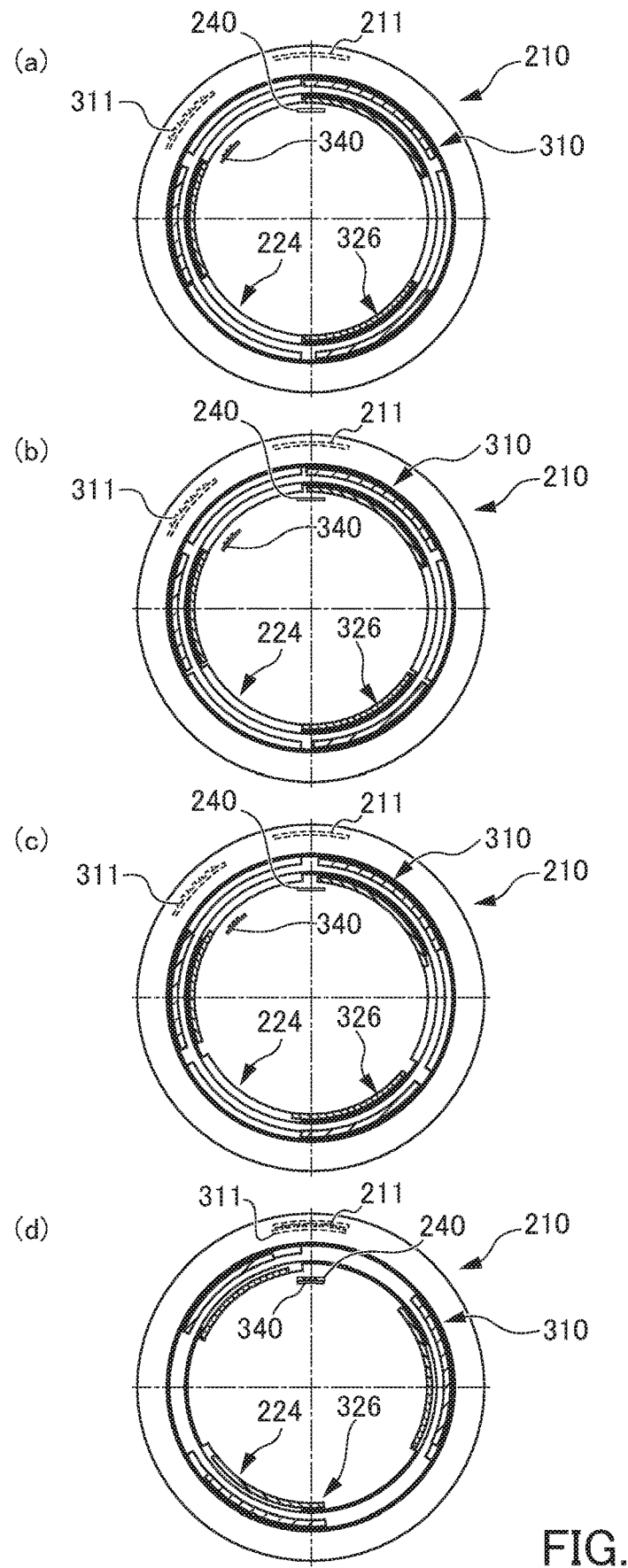
FIG. 7 is a front view showing a procedure for attaching the lens barrel to the camera body.

Hence, an alignment mechanism for the amount of rotation of the mount will be described. FIG. 7 is a diagram showing a procedure for attaching the lens barrel to the camera body. FIG. 7 is also a front view when seen from the subject side parallel to the optical axis. Before the start of the engagement of the body outer shell coupling unit 216 and the lens outer shell coupling unit 316, the engagement of the body inner shell coupling unit 217 and the lens inner shell coupling unit 317 is started.

For example, when in a state shown in FIG. 7(a), the lens outer shell 301 is rotated in a clockwise direction by, for example, 5°, as shown in FIG. 7(b), the engagement of the lens inner shell coupling unit 317 with the body inner shell coupling unit 217 is started. Here, the lens outer shell coupling unit 316 has not engaged with the body outer shell coupling unit 216 yet. When in this state, the lens outer shell 301 is further rotated in the clockwise direction by, for example, 5° (10° from the state shown in FIG. 7(a)), as shown in FIG. 7(c), the engagement of the lens outer shell coupling unit 316 with the body outer shell coupling unit 216 is started. When in this state, the lens outer shell 301 is further rotated in the clockwise direction by, for example, 40° (50° from the state shown in FIG. 7(a)), as shown in FIG. 7(d), the engagement of the lens inner shell coupling unit 317 with the body inner shell coupling unit 217 is completed, with the result that they are coupled to each other. Here, the engagement of the lens outer shell coupling unit 316 with the body outer shell coupling unit 216 is not completed. Hence, the lens outer shell 301 is further rotated, and thus the engagement of the lens outer shell coupling unit 316 with the body outer shell coupling unit 216 is completed, with the result that they are coupled to each other. The lens outer shell coupling unit 316 may be coupled to the body outer shell coupling unit 216 substantially simultaneously when the lens inner shell coupling unit 317 is coupled to the body inner shell coupling unit 217.

As described above, a difference is produced between timing with which the engagement of the lens inner shell coupling unit 317 with the body inner shell coupling unit 217 is started and timing with which the engagement of the lens outer shell coupling unit 316 with the body outer shell coupling unit 216 is started. Specifically, the timing with which the engagement of the lens inner shell coupling unit 317 with the body inner shell coupling unit 217 is started is earlier than the timing with which the engagement of the lens outer shell coupling unit 316 with the body outer shell coupling unit 216 is started. In this way, it is possible to prevent the problem in which the amount of rotation (rotation angle) of the lens inner shell 302 is insufficient, and in which thus the body inner shell coupling unit 217 and the lens inner shell coupling unit 317 are not appropriately coupled to each other. Hence, the practicality and the convenience can be enhanced.

In this way, the problem is prevented in which when the lens barrel 3 is attached to the camera body 2, the amount of rotation (rotation angle) of the lens inner shell 302 is insufficient, and in which thus the coupling of the body inner shell mount 224 and the lens inner shell mount 326 is insufficient.

By contrast, as compared with an angle at which the lens outer shell coupling unit 316 engages with the body outer shell coupling unit 216, an angle at which the lens inner shell coupling unit 317 engages with the body inner shell coupling unit 217 may be decreased. In this way, it is also possible to achieve the same purpose.

Furthermore, a configuration can be adopted in which an actuator is provided, and in which when the lens outer shell 301 of the lens barrel 3 is coupled to the body outer shell 201 of the camera body 2, this serves as a trigger such that the lens inner shell 302 of the lens barrel 3 is coupled to the body inner shell 202 of the camera body 2. A configuration may also be adopted in which the pressing of a button (unillustrated) by the user serves as a trigger so as to perform the same operation. The mechanisms of 1-1 to 1-3 described above may be configured single or may be combined as necessary.

(1-4. Mechanism of Holding Coupling Units)

In the camera system 1, a mechanism (mechanism of holding the coupling units) for preventing the looseness of the coupling units is provided. For example, when the lens inner shell coupling unit 317 engages with the body inner shell coupling unit 217 by the mechanism of the bayonet, a relative displacement in the direction of the optical axis between the lens inner shell coupling unit 317 and the body inner shell coupling unit 217 is unlikely to occur but a displacement in the direction of rotation about the optical axis is likely to occur. Hence, a mechanism for reducing the displacement in the direction of rotation about the optical axis will be described. Specifically, the camera system 1 includes an inner shell coupling holding mechanism which holds (fixes, locks) the coupling of the lens inner shell coupling unit 317 and the body inner shell coupling unit 217. The camera system 1 also includes an outer shell coupling holding mechanism holds (fixes, locks) the coupling of the lens outer shell coupling unit 316 and the body outer shell coupling unit 216. Hence, it is possible to prevent the problem in which when the camera system 1 is being used, the body inner shell 202 and the lens inner shell 302 are displaced from each other in the direction of rotation about the optical axis, and in which thus the coupling (engagement) is released. It is also possible to prevent the problem in which when the camera system 1 is being used, the body outer shell 201 and the lens outer shell 301 are displaced from each other in the direction of rotation about the optical axis, and in which thus the coupling (engagement) is released. The outer shell coupling holding mechanism and the inner shell coupling holding mechanism may be formed by any method, and for example, a mechanical method, an electrical method and a magnetic method can be used. This holding mechanism may include only the outer shell coupling holding mechanism. This is because since the movable range of the inner shell with respect to the outer shell is somewhat restricted, when the outer shell side is firmly coupled (engaged), it is unlikely that the coupling (engagement) of the inner shell side is released. In other words, the outer shell coupling holding mechanism is provided, and thus it is possible to hold the coupling (engagement) of the inner shell side. The inner shell coupling holding mechanism is also provided, and thus it is also possible to reduce a displacement in the direction of rotation about the optical axis on the inner shell side.

The camera system 1 further includes a release mechanism which releases, with the outer shell coupling holding mechanism, the coupling of the lens outer shell 301 and the body outer shell 201. The release mechanism is operated, and thus the locking with the outer shell coupling holding mechanism is released. As the release mechanism is operated, the locking with the outer shell coupling holding mechanism is also released. Hence, the camera system 1 uses the release mechanism so as to release the locking with the outer shell coupling holding mechanism and so as to release the locking with the inner shell coupling holding mechanism. In this way, it is possible to easily attach and detach the lens barrel 3.

Figure 8:
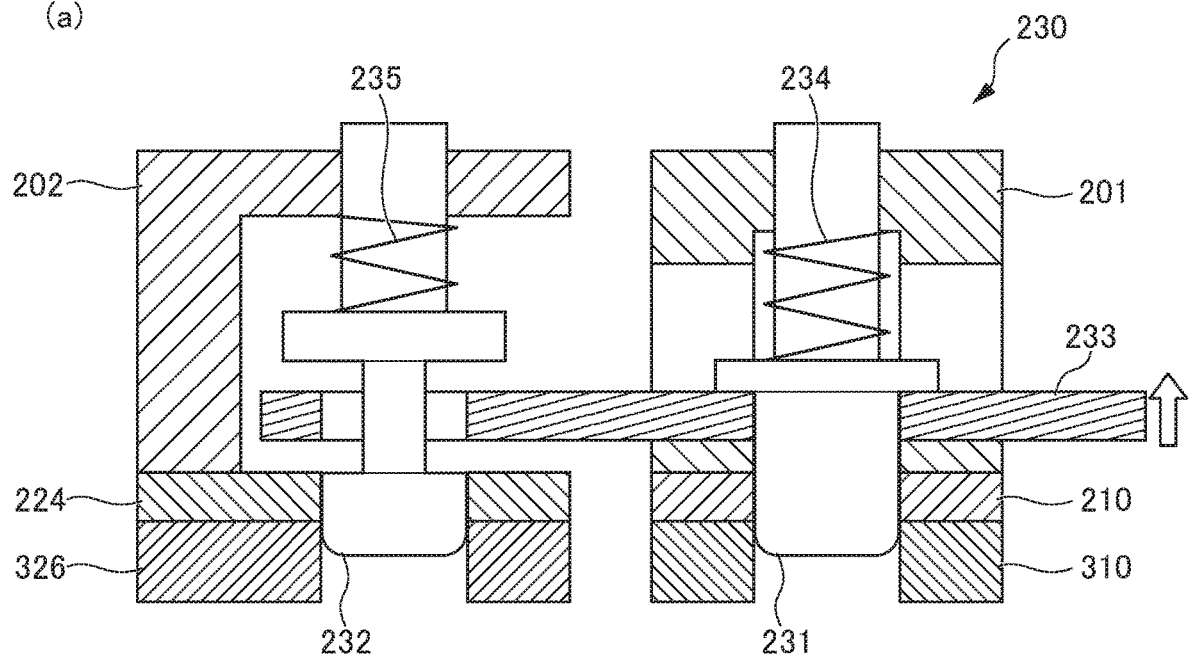
FIG. 8 is a diagram showing an example of a fixing mechanism (lock mechanism of a mount) which prevents the looseness of a bayonet mount.
Figure 8:
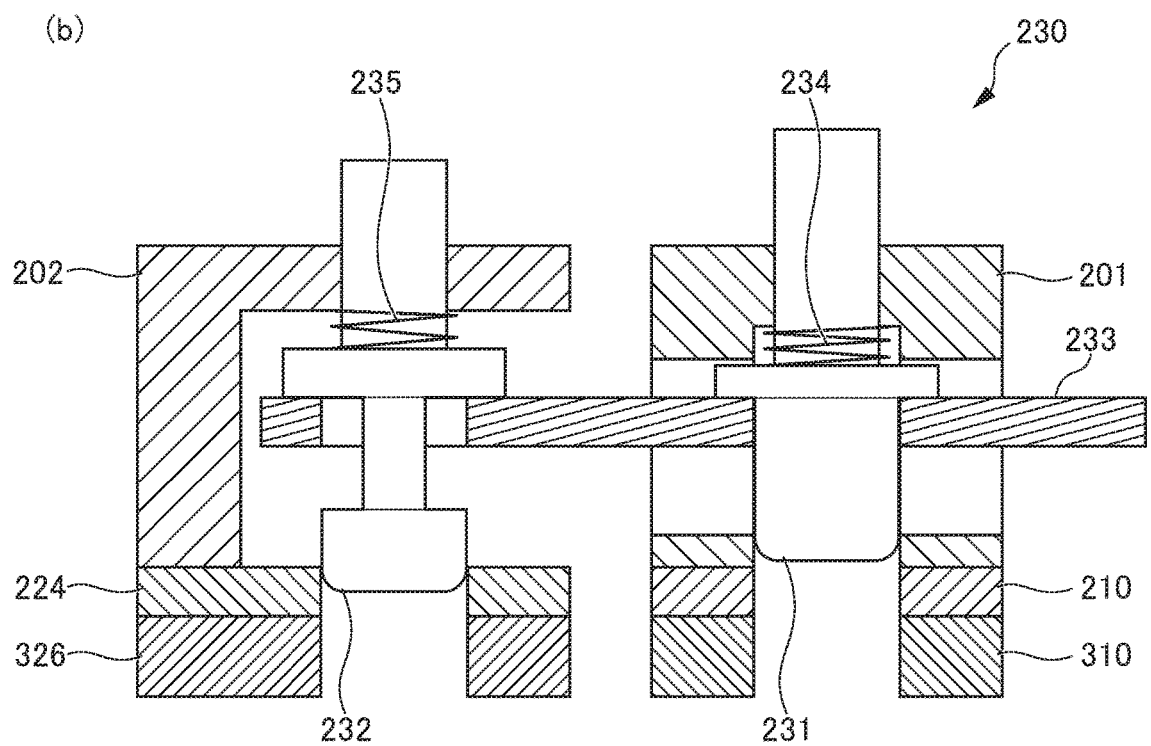

FIG. 8 is a diagram showing an example of a mechanism (coupling unit holding mechanism) which prevents the looseness of the coupling units (for example, a displacement in the direction of rotation about the optical axis). An up/down direction in FIG. 8 indicates a direction along the optical axis of the lens barrel 3. Specifically, for example, as shown in FIG. 8(*a*), with an outer shell mount coupling pin 231, the coupling of the body outer shell coupling unit 216 and the lens outer shell coupling unit 316 is locked, and thus the lens outer shell 301 is fixed to the body outer shell 201. The outer shell mount coupling pin 231 is biased downward in the figure by a spring 234.

Moreover, with an inner shell mount coupling pin 232, the coupling of the body inner shell coupling unit 217 and the lens inner shell coupling unit 317 is locked, and thus the lens inner shell 302 is fixed to the body inner shell 202. The inner shell mount coupling pin 232 is biased downward in the figure by the spring 234.

An interlocking lever 233 is further provided so as to straddle the outer shell mount coupling pin 231 and the inner shell mount coupling pin 232, and so as to be freely raised and lowered. The interlocking lever 233 is provided so as to be able to move in a direction (up/down direction in FIG. 8) along the optical axis of the lens barrel 3. Here, the outer shell mount coupling pin 231 and the interlocking lever 233 may be fitted to each other so as to be able to move internally. On the other hand, the inner shell mount coupling pin 232 and the interlocking lever 233 engage with each other in a sufficient movable range in the radial direction of the inner shell mount coupling pin 232 such that the body inner shell 202 can swing with respect to the body outer shell 201. Interference between the inner shell mount coupling pin 232 and the interlocking lever 233 in the up/down direction of FIG. 8 caused by the swinging of the body inner shell 202 can be absorbed by the extension and contraction of a spring 235.

Then, for example, the interlocking lever 233 is manually operated by the user. Specifically, when the interlocking lever 233 is moved upward in FIG. 8, as shown in FIG. 8(*b*), the outer shell mount coupling pin 231 is pushed up by the interlocking lever 233 so as to release an outer shell coupling lock which locks the coupling of the body outer shell coupling unit 216 and the lens outer shell coupling unit 316. At the same time, the inner shell mount coupling pin 232 is also pushed up by the interlocking lever 233 so as to release an inner shell coupling lock which locks the coupling of the body inner shell coupling unit 217 and the lens inner shell coupling unit 317.

Hence, the release mechanism is only operated, and thus it is possible to release not only the outer shell coupling lock but also the inner shell coupling lock, with the result that the lens barrel 3 can easily be attached and detached. When the lens barrel 3 is fitted to the camera body 2, the lens barrel 3 is only rotated up to a predetermined position, and thus the outer shell coupling lock and the inner shell coupling lock are automatically performed. In this way, the practicality and the convenience of the camera system 1 can be enhanced.

There is no limitation to the outer shell coupling holding mechanism and the inner shell coupling holding mechanism as described above. For example, in the inner shell coupling holding mechanism, the inner shell coupling lock may be electrically performed by utilization of an actuator or the like. Preferably, in this case, for example, control is performed such that when the outer shell coupling lock is released by the operation of the release mechanism (for example, the movement of the interlocking lever 233), the inner shell coupling lock is released with the actuator accordingly.

(2. Configuration for Sensing Coupling of Inner Shell Mount)

The user can easily and visually check the state of the outer shell side whereas the user cannot visually check the inner shell side. Hence, the user cannot visually check whether or not the lens inner shell 302 and the body inner shell 202 are appropriately coupled to each other. Hence, the camera system 1 of the present embodiment includes sensing units which sense (detect) whether or not the inner shells are appropriately coupled to each other. In other words, the camera system 1 includes the sensing units which sense the state of engagement of the inner shells. As shown in FIGS. 1A, 1B and 7, in the body inner shell 202, the coupling sensing unit 240 is provided. In the lens inner shell 302, the coupling sensing unit 340 is provided. With the coupling sensing unit 240 and the coupling sensing unit 340, it is possible to sense whether or not the inner shells are appropriately coupled to each other. The detection units as described above can perform communication or energization. In a state (for example, FIGS. 7(*a*), 7(*b*), 7(*c*) and the like) where the body inner shell 202 and the lens inner shell 302 are not appropriately coupled to each other, the coupling sensing unit 240 and the coupling sensing unit 340 are not in contact with each other. On the other hand, in a state (for example, FIG. 7(*d*) and the like) where the body inner shell 202 and the lens inner shell 302 are appropriately coupled to each other, the coupling sensing unit 240 and the coupling sensing unit 340 make contact with each other. The coupling sensing units make contact with each other so as to be able to perform communication or energization. Hence, when the coupling sensing unit 240 and the coupling sensing unit 340 make contact with each other, and thus energization or communication is sensed, it is possible to determine that the lens inner shell 302 and the body inner shell 202 are accurately coupled to each other. When the coupling sensing unit 240 and the coupling sensing unit 340 do not make contact with each other, and thus energization or communication is not sensed, it is possible to determine that the lens inner shell 302 and the body inner shell 202 are not accurately coupled to each other. The determination as described above may be performed by the lens control unit 314 or the body control unit 215. The coupling sensing unit 240 and the coupling sensing unit 340 are provided, and thus it is possible to determine the state of coupling of the body inner shell 202 and the lens inner shell 302 which cannot be determined from appearance.

Figure 9:
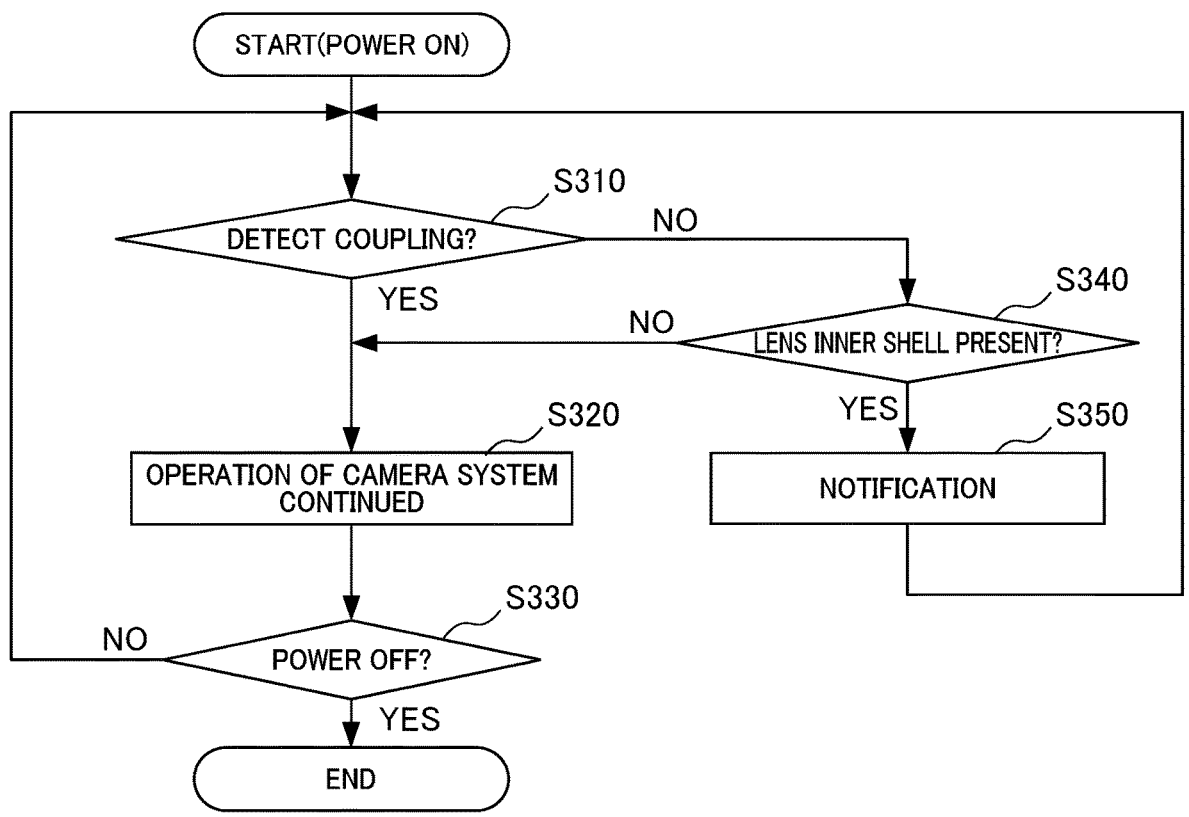
FIG. 9 is a flowchart showing the operation of the body control unit 215 on the detection of the state of coupling with a coupling sensing unit 240 and a coupling sensing unit 340.

FIG. 9 is a flowchart showing the operation of the body control unit 215 on the detection of the state of coupling with the coupling sensing unit 240 and the coupling sensing unit 340. The lens control unit 314 may perform the operation shown in FIG. 9. When the power of the camera body 2 is turned on so as to start the operation, in S310, the body control unit 215 determines whether or not the energization (or communication) of the coupling sensing unit 240 and the coupling sensing unit 340 is appropriately performed, that is, whether or not the body inner shell 202 and the lens inner shell 302 are appropriately coupled (engaged) to each other. When in S310, it is determined that the energization or communication is performed (that the lens inner shell 302 and the body inner shell 202 are coupled to each other), the process proceeds to S320. When it is determined that the energization or communication is not performed (that the lens inner shell 302 and the body inner shell 202 are not coupled to each other), the process proceeds to S340.

In S320, the body control unit 215 continues the operation of the camera system 1. Then, the process proceeds to S330. In S330, the body control unit 215 determines whether or not the power is turned off. When the power is not turned off, the process returns to S310 whereas when the power is turned off, the operation is completed.

In S340, the body control unit 215 determines whether or not the fitted lens barrel includes an inner shell. For example, the body control unit 215 receives, through the contact 311 included in the lens outer shell 301 and the contact 211 included in the body outer shell 201, information on the lens barrel 3 from the lens barrel 3. The information on the lens barrel 3 includes information indicating whether or not the lens barrel includes an inner shell. When the information on the lens barrel 3 includes information indicating that the lens barrel includes an inner shell (or does not include information indicating that the lens barrel does not include an inner shell), the body control unit 215 determines that the fitted lens barrel includes an inner shell, and the process proceeds to S350. When the information on the lens barrel 3 does not include information indicating that the lens barrel includes an inner shell (or includes information indicating that the lens barrel does not include an inner shell), the body control unit 215 determines that the fitted lens barrel includes an inner shell, and the process proceeds to S320.

Here, when an unillustrated lens barrel (for example, a lens barrel which is used in a conventional camera system) which does not include the lens inner shell 302 is fitted to the camera body 2, even if this lens barrel is accurately coupled to the camera body 2, the coupling sensing unit 340 is not provided in the lens barrel, with the result that the energization or communication of the coupling sensing unit 240 and the coupling sensing unit 340 is not performed. Even when the lens barrel which does not include the lens inner shell 302 as described above is fitted, if it is possible to perform shooting, this is more convenient.

Hence, when the lens barrel 3 including the lens inner shell 302 is fitted to the camera body 2, information indicating that the lens barrel 3 includes the lens inner shell 302 is transmitted through the contact 211 and the contact 311 of the body outer shell 201 and the lens outer shell 301 to the camera body 2 from the lens barrel 3. In this way, the camera body 2 can identify whether or not the fitted lens barrel includes the lens inner shell 302. Hence, even when it is likely that not only the lens barrel 3 which includes the lens inner shell 302 but also the lens barrel which does not include the lens inner shell 302 is fitted to the camera body 2, it is possible to appropriately notify the user whether or not the lens inner shell 302 of the lens barrel 3 is accurately coupled to the body inner shell 202 of the camera body 2, and moreover, even when the lens barrel which does not include the lens inner shell 302 is fitted to the camera body 2, it is possible to perform shooting.

In S350, it is determined, in S310, that the body inner shell 202 and the lens inner shell 302 are not appropriately coupled to each other, and it is further determined that the fitted lens barrel includes the lens inner shell 302. Hence, the body control unit 215 uses sound, a display, light or the like so as to notify the user of information indicating that the body inner shell 202 and the lens inner shell 302 are not appropriately coupled to each other. In addition to or instead of the notification, for example, the operation of the camera system 1 may be temporarily stopped.

In addition to the operation described above, when it is detected that the lens inner shell 302 of the lens barrel 3 is coupled to the body inner shell 202 of the camera body 2, the information thereof may be notified to the user.

Furthermore, the coupling sensing unit (240, 340) described above can also be used as a decoupling sensing unit for detecting that a state where the coupling of the body inner shell 202 and the lens inner shell 302 is released, that is, a decoupled state is achieved. In this case, for example, when it is detected that the coupling of the body inner shell 202 and the lens inner shell 302 is released, it is possible to use sound, a display, light or the like so as to notify the user of information thereof.

(3. Forced Release Mechanism)

The camera system 1 further includes a forced release mechanism so that when the lens inner shell 302 is firmly attached to the body inner shell 202 for some reason, and thus it is difficult to detach it, the camera body 2 and the lens barrel 3 can be detached from each other. Here, as the case where the lens inner shell 302 is firmly attached to the body inner shell 202, for example, a case is considered where the lens inner shell coupling unit 317 in an abnormal state such as deformation is attached to the body inner shell coupling unit 217 such that it is difficult to detach it. When for example, the camera system 1 falls in a state where the lens barrel 3 is attached to the camera body 2, it is considered that the body inner shell 202 or the lens inner shell 302 is obliquely attached to the body outer shell 201 or the lens outer shell 301, and that thus it is difficult to detach the lens barrel 3. In such a case, when no countermeasure (for example, the forced release mechanism in the present embodiment) is provided, even if the lens outer shell 301 is rotated, it is likely that the coupling of the lens inner shell 302 and the body inner shell 202 is not released. In this case, it is impossible to detach the lens barrel 3 from the camera body 2.

Figure 10:
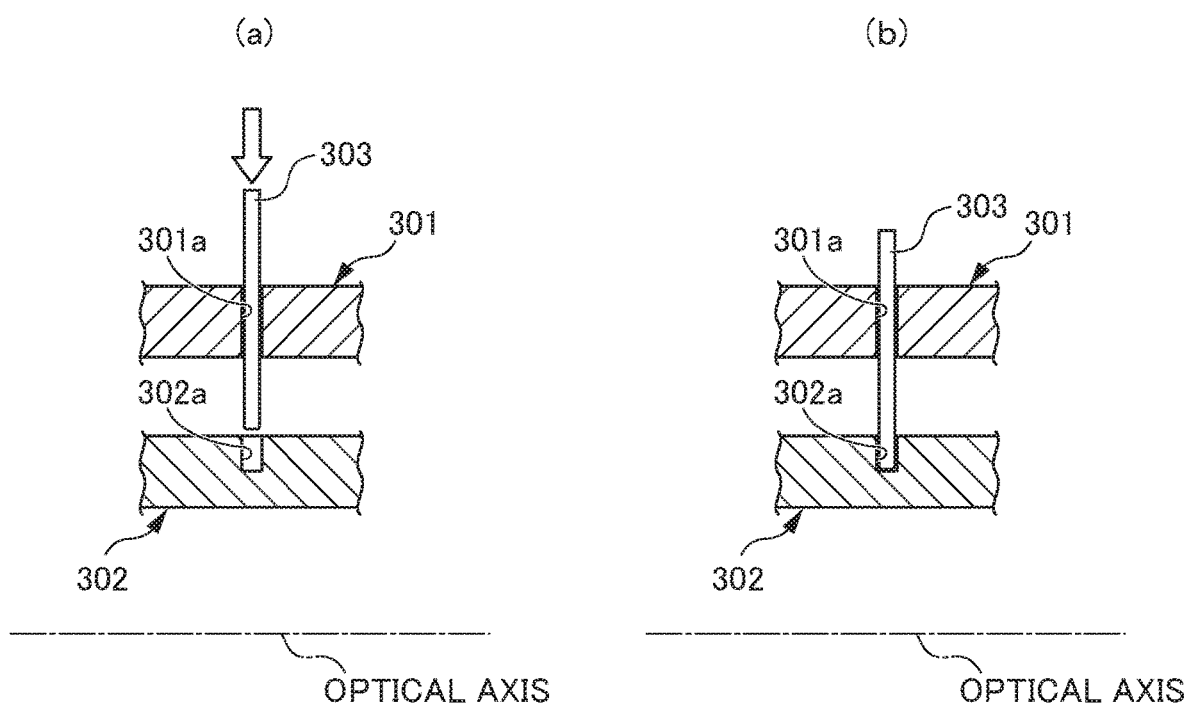
FIG. 10 is a diagram showing an outline of a coupling release mechanism.

Hence, the camera system 1 of the present embodiment includes a coupling release mechanism (forced release mechanism) which directly rotates the lens inner shell 302 from the outside of the lens outer shell 301 so as to release the state of coupling of the body inner shell 202 and the lens inner shell 302. FIG. 10 is a diagram showing an outline of the coupling release mechanism. As shown in FIG. 10, the coupling release mechanism is formed with: an operation pin 303 which can be attached, as necessary, to the long hole 301a of the lens outer shell 301 so as to be freely raised and lowered (so as to be freely moved in the radial direction of the lens outer shell 301); and a fitting hole 302a which is formed in the surface of the lens inner shell 302. Here, the long hole 301a is formed so as to be extended along the circumferential direction (direction of rotation) of the lens outer shell 301.

Hence, when the lens inner shell 302 is firmly attached to the body inner shell 202, and thus the lens inner shell 302 is not rotated by the rotation of the lens outer shell 301, the operation pin 303 is attached so as to be fitted into the fitting hole 302a of the lens inner shell 302, in such a state, the operation pin 303 is moved in the circumferential direction of the lens outer shell 301 and thus the lens inner shell 302 can be forcefully rotated. Hence, the reliability of the camera system 1 is enhanced, and it is easy to cope with an emergency.

Although in the description, the example is used where the operation pin 303 is prepared as a separate component from the lens barrel 3, the operation pin 303 may be an additional unit which is integrally attached to the lens barrel 3. A lid which hides the presence of the long hole 301a may be provided.

(4. Another Mount Configuration Replacing Bayonet)

Figure 11:
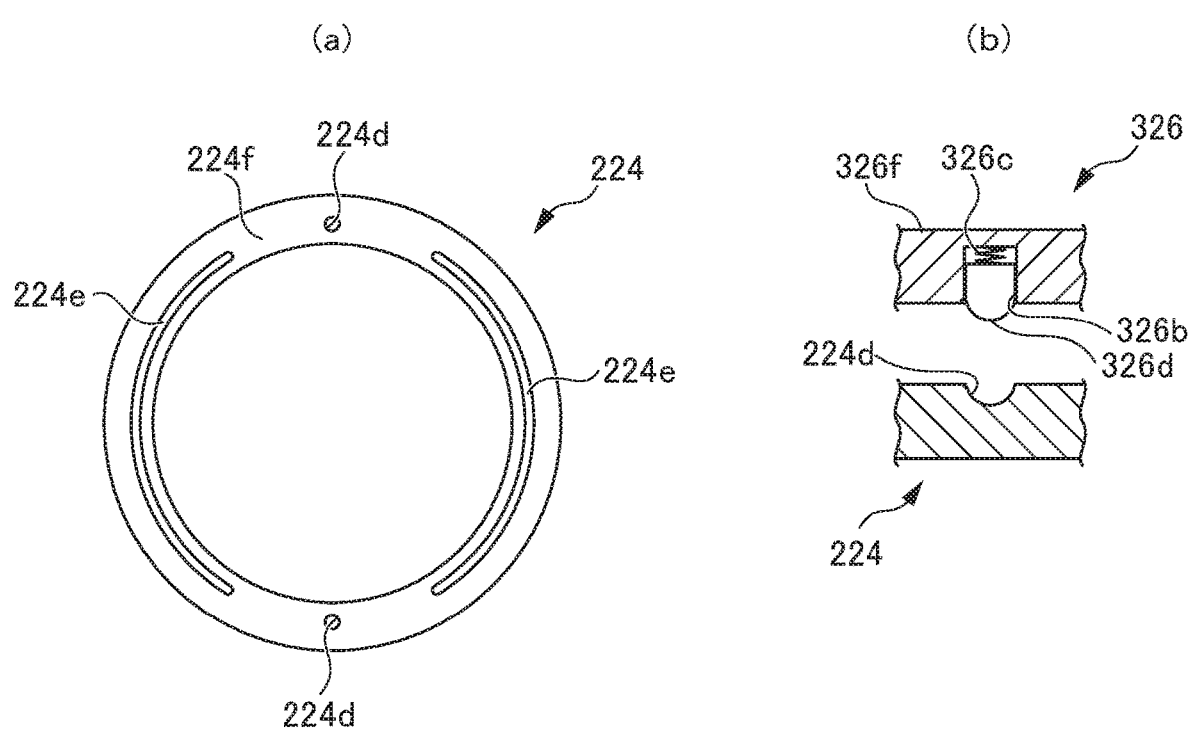
FIG. 11 is a diagram showing a variation of a mount configuration on an inner shell side.

In the above description, the example is used where the lens inner shell coupling unit 317, the lens outer shell coupling unit 316, the body inner shell coupling unit 217 and the body outer shell coupling unit 216 form the bayonet shape. However, the form of the mount is not limited to the bayonet type, and another configuration may be adopted. Examples thereof include a pin, a spring, a magnet and the like. FIG. 11 is a diagram showing a variation of the mount configuration on the inner shell side. In the variation, instead of the bayonet method described above, a pin engagement method is adopted.

Specifically, as shown in FIG. 11(a), the body inner shell mount 224 includes an annular mount main body 224f. In the annular mount main body 224f, two engagement holes 224d are formed at an interval of 180° in its circumference. In the mount main body 224f, two arc-shaped magnets 224e are embedded at an interval of 180° so as to be located between the two engagement holes 224d.

On the other hand, as shown in FIG. 11(b), the lens inner shell mount 326 includes an annular mount main body 326f. In the mount main body 326f, two concave portions 326b are formed at an interval of 180° in its circumference so as to correspond to the two engagement holes 224d in the body inner shell mount 224. An engagement pin 326d whose tip end is hemispherically cylindrical (so-called bullet shape) is elastically attached to each of the concave portions 326b through a coil spring 326c so as to freely extend and extract.

In the body inner shell mount 224 and the lens inner shell mount 326 of the pin engagement method as described above, the two engagement pins 326d are engaged with the two concave portions 326b, and thus in a state where the lens inner shell mount 326 is located in a predetermined position with respect to the body inner shell mount 224, the lens inner shell mount 326 can be fixed to the body inner shell mount 224 by the magnetic force of the magnets 224e. Consequently, the lens inner shell 302 of the lens barrel 3 and the body inner shell 202 of the camera body 2 can be coupled to each other highly accurately and easily.

As with the bayonet method, the pin engagement method as described above is not electrical but mechanical, and thus it is advantageous to be able to previously prevent the lens inner shell mount 326 from inconveniently falling off the body inner shell mount 224 as a result of the battery 212 running out in a careless manner.

The pin engagement method is not limited to the coupling of the body inner shell mount 224 and the lens inner shell mount 326, and may be adopted for the coupling of the body outer shell mount 210 and the lens outer shell mount 310.

(5. Contact Configuration)

In the camera system 1 of the present embodiment, as described previously, in the subject side end portion of the body outer shell 201, the contact 211 for communication or energization is provided. In the body side end portion of the lens outer shell 301, the contact 311 for communication or energization is provided. Hence, all the exchange of electrical signals and power between the camera body 2 and the lens barrel 3 can be performed on the outer shell side. In this way, even when a conventional camera system which does not include the lens inner shell 302 or the body inner shell 202 is coupled to the lens outer shell 301 or the body outer shell 201, communication or energization with the conventional camera system can be performed. Hence, the conventional camera system can be used by being attached and detached with respect to the camera system 1. Since the yaw drive unit 312 or the pitch drive unit 322 is included in the lens outer shell 301, electrical signals and power are exchanged between the camera body 2 and the lens barrel 3 on the outer shell side where the yaw drive unit 312 or the pitch drive unit 322 is arranged, and thus it is possible to minimize the number of FPCs or the like therewithin and the size thereof. When the FPCs are arranged between the inner shell and the outer shell, they serve as a load for the swinging of the inner shell, and thus the reduction of the number of FPCs produces a significant effect in the camera system 1.

In the lens barrel 3 of the camera system 1, the contact 311 is provided in the lens outer shell 301, and thus the lens barrel 3 can be used by being fitted to a camera body (unillustrated) which does not include the body inner shell 202. Here, in the lens barrel 3, the lens inner shell 302 is locked to the lens outer shell 301 by the lens lock mechanism described previously, and thus it is possible to previously prevent the optical axis of the lens group L from being displaced.

In this case, the shift direction anti-vibration system 330 is provided in the lens barrel 3 of the camera system 1, and thus even when the lens barrel 3 is fitted to the camera body which does not include the body inner shell 202, lens shake correction can be performed. The image capturing element shake correction which is performed by driving the image capturing element in any one of the pitch direction, the yaw direction, the roll direction and the shift direction is provided, and thus it is possible to perform the shake correction. A configuration may be adopted in which when the lens barrel 3 of the camera system 1 does not have the function as described above, the entire lens inner shell 302 of the lens barrel 3 can be driven so as to perform the shake correction.

Although the configuration is described in which the contacts 311 and 211 are provided on the outer shell side, the contacts 311 and 211 may be provided on the inner shell side. The contacts 311 and 211 may be provided on the outer shell side and on the inner shell side. Since a zoom actuator for driving the lens group L is provided in the lens inner shell 302, information on the drive of the zoom actuator is preferably transmitted and received by utilization of the contacts 211 and 311 included on the inner shell side. As described above, the contact present on the side (the inner shell side or the outer shell side) on which a target to be controlled is provided is preferably utilized so as to transmit and receive information necessary for the control.

(Other Configurations)

In the lens barrel 3 of the camera system 1, the lens inner shell 302 is prevented from being protruded backward (toward the side of the camera body 2) from the lens outer shell 301 along the direction of the optical axis. Hence, even when the lens barrel 3 is fitted to the camera body which does not include the body inner shell 202, not only at the time of fitting but also at the time of shake correction, the lens inner shell 302 is prevented from interfering with the components (such as a mirror and a shutter) of the camera body. When the lens barrel 3 is fitted to the camera body which does not include the body inner shell 202, an actuator (unillustrated) is used to move the entire lens inner shell 302 forward (to the subject side), and thus it is possible to prevent the lens inner shell 302 from interfering with the components of the camera body.

On the other hand, in the camera body 2 of the camera system 1, the contact 211 is provided in the body outer shell 201. Hence, even the lens barrel (unillustrated) which does not include the lens inner shell 302 can also be used by being fitted to the camera body 2. Here, in the camera body 2, the body inner shell 202 is locked to the body outer shell 201 by the body lock mechanism described above, and thus it is possible to previously prevent the position of the image capturing element 220 from being displaced.

In the camera body 2 of the camera system 1, the body inner shell 202 is prevented from being protruded forward (toward the subject side) from the body outer shell 201 along the direction of the optical axis. Hence, even when the lens barrel which does not include the lens inner shell 302 is fitted, not only at the time of fitting but also at the time of shake correction, the body inner shell 202 is prevented from interfering with the components (such as a lens located in the backmost part (the side of the camera body 2) of the lens group L) of the lens barrel. When the lens barrel which does not include the lens inner shell 302 is fitted to the camera body, an actuator (unillustrated) is used to move the entire body inner shell 202 backward, and thus it is also possible to prevent the body inner shell 202 from interfering with the components of the lens barrel.

Second Embodiment

Figure 12A:
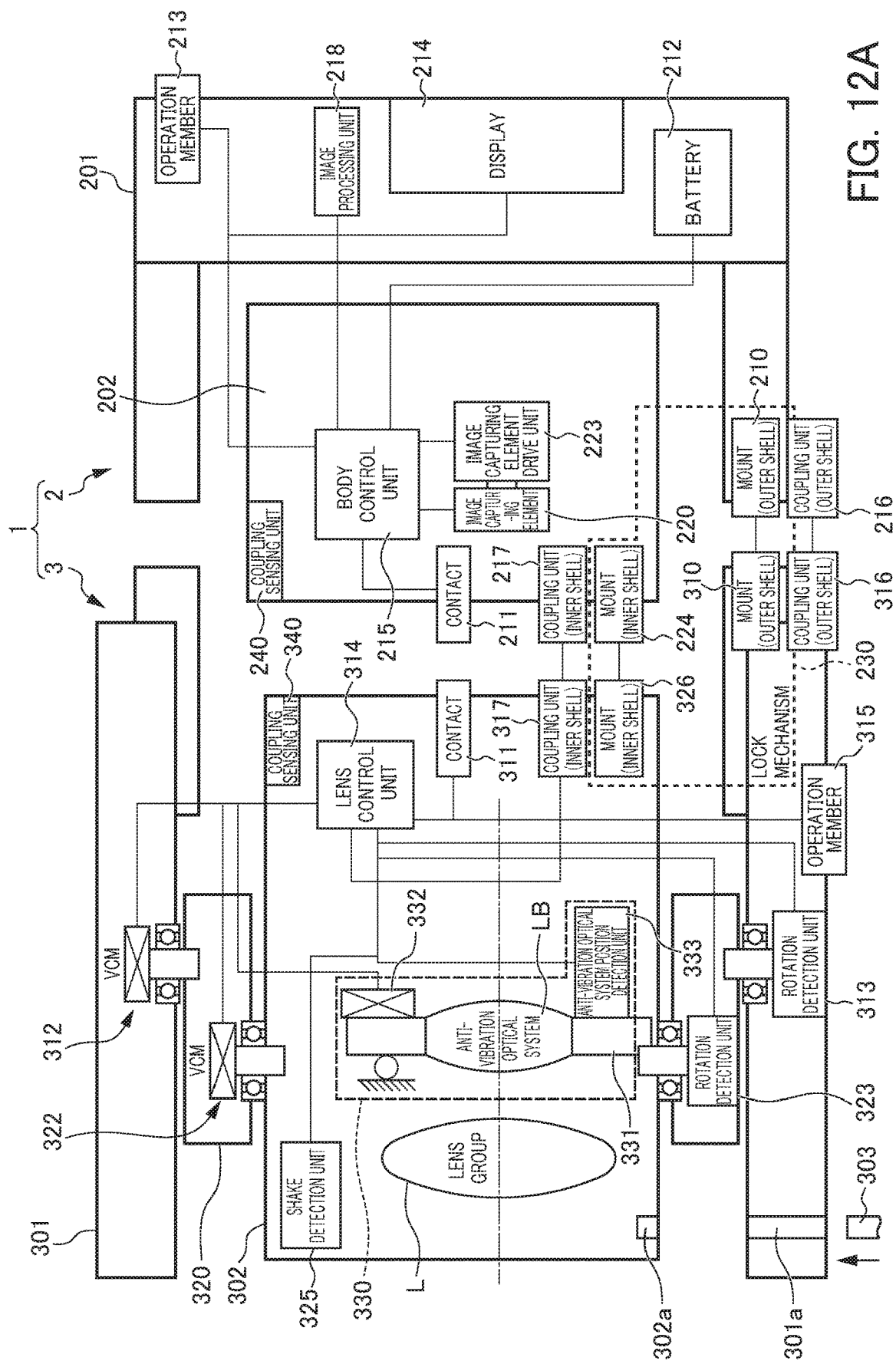
FIG. 12A is a system configuration diagram of a camera system 1 which includes the lens barrel 3 of a second embodiment and a camera body 2.

FIG. 12A is a system configuration diagram of a camera system 1 which includes the lens barrel 3 of a second embodiment and a camera body 2. FIG. 12B is a simplified diagram of the system configuration of the camera system 1 which includes the lens barrel 3 of the second embodiment and the camera body 2. Since as in the relationship of FIGS. 1A and 1B described previously, FIGS. 12A and 12B show the same camera system 1, in these figures, for example, a configuration which is not included in one of the figures is complemented in the other figure, and thus they complement each other. In the camera system 1 according to the second embodiment, as shown in FIGS. 12A and 12B, the contact 211 on the side of the camera body 2 is provided not in the body outer shell 201 but in the body inner shell 202. The body control unit 215 is provided not in the body outer shell 201 of the camera body 2 but in the body inner shell 202. The contact 311 on the side of the lens barrel 3 is provided not in the lens outer shell 301 but in the lens inner shell 302. The lens control unit 314 is provided not in the lens outer shell 301 of the lens barrel 3 but in the lens inner shell 302. Since the other configurations are basically the same as those of the first embodiment described above, the same members are identified with the same reference numerals, and the description thereof will be omitted.

In the second embodiment, the same operational effects as in the first embodiment described above are achieved. Moreover, in the second embodiment, the contact 211 and the contact 311 are respectively provided in the body inner shell 202 and the lens inner shell 302, and thus power can be supplied from the battery 212 without intervention of the FPCs to electrical components (for example, the zoom actuator and the shift direction anti-vibration system 330) installed in the lens inner shell 302, with the result that it is possible to reduce the number of FPCs accordingly. Without intervention of the FPCs, electrical signals can be transmitted and received to and from the electrical components installed in the lens inner shell 302, and thus it is possible to reduce the number of FPCs accordingly. Consequently, it is possible to enhance the flexibility (the range of swinging) of the lens inner shell 302 with respect to the lens outer shell 301 of the lens barrel 3, and it is also possible to reduce failures caused by the FPCs.

Since the contacts 211 and 311 whose numbers correspond to the amount of communication thereof are provided, it is possible to appropriately transmit and receive electrical signals to and from the electrical components installed in the lens inner shell 302.

(Variations)

The present invention is not limited to the embodiments described above, and various variations and modifications are possible.

(1) In the embodiments discussed above, the case is described where in the camera body 2, the body outer shell 201 and the body inner shell 202 are electrically connected to each other with the FPCs. However, electrical signals may be transmitted and received between the body outer shell 201 and the body inner shell 202 by utilization of wireless communication such as Wi-Fi (Wireless Fidelity) or proximity communication.

(2) In the embodiments discussed above, the case is described where in the lens barrel 3, the lens outer shell 301 and the lens inner shell 302 are electrically connected to each other with the FPCs. However, electrical signals may be transmitted and received between the lens outer shell 301 and the lens inner shell 302 by utilization of wireless communication such as Wi-Fi or proximity communication.

(3) In the embodiments discussed above, the mounts of the bayonet method and the pin engagement method are described. However, instead of or in addition to these methods, another method (such as a magnet or a spring) may be used.

(5) The embodiments discussed above are described using the example where the two actuators, that is, the pitch drive unit 322 and the yaw drive unit 312 are provided in order to perform the integral drive shake correction. However, there is no limitation to this example, and an actuator which can be driven both in the pitch direction and in the yaw direction may be used. In this case, the housing 320 may be omitted.

(6) The embodiments discussed above are described using the example where the lens barrel 3 includes the pitch drive unit 322 and the yaw drive unit 312. However, there is no limitation to this example, and the camera body 2 may include the pitch drive unit 322 or the yaw drive unit 312. Both the drive units may be included in the camera body 2 or one of the drive units may be included in the camera body 2, and the other drive unit may be included in the lens barrel 3.

(7) In the description of the embodiments discussed above, the lens inner shell 302 and the body inner shell 202 are driven in the pitch direction or the yaw direction so as to perform the shake correction. However, there is no limitation to this configuration, and the lens inner shell 302 and the body inner shell 202 may be driven in the shift direction so as to perform the shake correction. In this case, instead of the pitch drive unit 322 and the yaw drive unit 312, a drive unit which can be driven in the shift direction is provided so as to drive the lens inner shell 302 or the housing 320 in the shift direction.

(8) The embodiments discussed above are described using the example where the lens barrel 3 has the functions of the integral drive shake correction, the lens shake correction and the image capturing element shake correction. However, there is no limitation to this example, and for example, the lens barrel 3 may have at least one of the integral drive shake correction, the lens shake correction and the image capturing element shake correction or may have a plurality of types of shake correction.

(9) Although the embodiments discussed above are described using the example where the shake detection unit 325 is provided, a plurality of shake detection units may be provided. Any one of the shake detection units may be provided in the lens outer shell 301, the body inner shell 202 or the body outer shell 201.

The embodiments and the variations may be arbitrarily combined. The present invention is not limited to the embodiments described above.

EXPLANATION OF REFERENCE NUMERALS 1 camera system
2 camera body
3 lens barrel
201 body outer shell
202 body inner shell
210 body outer shell mount
211 contact
212 battery
213 operation member
214 display unit
215 body control unit
216 body outer shell coupling unit
217 body inner shell coupling unit
218 image processing unit
220 image capturing element
223 image capturing element drive unit
224 body inner shell mount
224c guide member
224d engagement hole
224e magnet
224f mount main body
231 outer shell mount coupling pin
232 inner shell mount coupling pin
233 interlocking lever
240 coupling sensing unit
241 nail portion
242 nail portion
301 lens outer shell
301a long hole
302 lens inner shell
302a fitting hole
303 operation pin
310 lens outer shell mount
311 contact
312 yaw drive unit
313 yaw direction rotation detection unit
314 lens control unit
315 operation member
316 lens outer shell coupling unit
317 lens inner shell coupling unit
320 housing
322 pitch drive unit
323 pitch direction rotation detection unit
325 first shake detection unit
326 lens inner shell mount
326b concave portion
326c coil spring
326d engagement pin
326f mount main body
330 shift direction anti-vibration system
332 shift drive unit
340 coupling sensing unit
401 motor
402 worm gear
403 lock ring
404 gear portion
405 gear member
406 protrusion portion
407 protrusion portion
L lens group

The invention claimed is:

1. A lens barrel with respect to which a camera body can be attached and detached, the lens barrel comprising:
a first barrel which includes a first engagement unit that engages with a first portion of the camera body;
a second barrel that (i) is arranged inside the first barrel, (ii) is swingable with respect to the first barrel, (iii) includes a second engagement unit that engages with a second portion of the camera body, and (iv) includes an optical system; and
a drive unit that swings the second barrel with respect to the first barrel.

2. The lens barrel according to claim 1, wherein timing with which the engagement of the first portion with the first engagement unit is started is different from timing with which the engagement of the second portion with the second engagement unit is started.

3. The lens barrel according to claim 2, wherein after the engagement of the second portion with the second engagement unit is started, the engagement of the first portion with the first engagement unit is started.

4. The lens barrel according to claim 1, wherein the first engagement unit or the second engagement unit has a bayonet shape.

5. The lens barrel according to claim 1, further comprising a detection unit which detects movement of the first barrel or movement of the second barrel.

6. The lens barrel according to claim 1, wherein the first barrel includes a communication unit which communicates with the camera body.

7. The lens barrel according to claim 1, wherein the second barrel includes a sensing unit which senses a state of the engagement of the second portion and the second engagement unit.

8. The lens barrel according to claim 7, further comprising a notification unit which notifies a state of the engagement sensed by the sensing unit.

9. The lens barrel according to claim 8, wherein the notification unit notifies that the second portion and the second engagement unit do not engage with each other.

10. The lens barrel according to claim 1, further comprising a holding mechanism which holds the engagement of the first engagement unit and the first portion and the engagement of the second engagement unit and the second portion.

11. The lens barrel according to claim 10, wherein the holding mechanism includes a first holding mechanism which holds the engagement of the first engagement unit and the first portion and a second holding mechanism which holds the engagement of the second engagement unit and the second portion.

12. The lens barrel according to claim 11, further comprising an operation unit which releases the engagement of the first engagement unit and the first portion held by the first holding mechanism and the engagement of the second engagement unit and the second portion held by the second holding mechanism.

13. A camera body with respect to which a lens barrel can be attached and detached, the camera body comprising:

a first housing which includes a first engagement unit that engages with a first barrel of the lens barrel; and a second housing that (i) is arranged inside the first housing, (ii) is swingable with respect to the first housing, (iii) includes a second engagement unit that engages with a second barrel of the lens barrel, and (iv) includes an image capturing element.

14. A camera system with respect to which a camera body and a lens barrel can be attached and detached, wherein:

the camera body includes:

a first housing; and a second housing which includes an image capturing element, the lens barrel includes:

a first barrel which engages with the first housing; and a second barrel which includes an optical system and which engages with the second housing, and at least one of the camera body and the lens barrel includes a drive unit which swings the second housing and the second barrel with respect to the first housing and the first barrel.

* * * * *